(12) United States Patent
Haney

(10) Patent No.: US 6,174,437 B1
(45) Date of Patent: *Jan. 16, 2001

(54) WATER TREATMENT SYSTEM

(75) Inventor: Harold E. Haney, San Patricio Garza Garcia (MX)

(73) Assignee: ATP International Ltd., Nassau (BS)

(*) Notice: Under 35 U.S.C. 154(b), the term of this patent shall be extended for 0 days.

This patent is subject to a terminal disclaimer.

(21) Appl. No.: 09/135,038

(22) Filed: Aug. 17, 1998

Related U.S. Application Data

(63) Continuation-in-part of application No. 08/655,774, filed on May 5, 1996, now Pat. No. 5,795,476, and a continuation-in-part of application No. 08/762,668, filed on Dec. 9, 1996.

(51) Int. Cl.[7] .................................. B01D 63/00
(52) U.S. Cl. .................... 210/257.2; 210/258; 210/97; 210/134; 210/104
(58) Field of Search .................. 210/257.1, 257.2, 210/652, 97, 104, 134, 137, 258, 195.1, 195.2, 321.6, 416.1; 417/310

(56) References Cited

U.S. PATENT DOCUMENTS

| | | |
|---|---|---|
| 2,785,806 | 3/1957 | Brown et al. . |
| 3,786,924 | 1/1974 | Huffman . |
| 3,846,295 | 11/1974 | Gibbs . |
| 3,856,676 | 12/1974 | Grimme, Jr. et al. . |
| 4,071,453 | 1/1978 | Koslowski . |
| 4,125,463 | 11/1978 | Chenoweth . |
| 4,169,789 | 10/1979 | Lerat . |
| 4,176,063 | 11/1979 | Tyler . |
| 4,623,467 | 11/1986 | Hamlin . |
| 4,744,895 | 5/1988 | Gales et al. . |
| 4,969,991 | 11/1990 | Valadez . |
| 5,066,402 | 11/1991 | Anselme et al. . |

(List continued on next page.)

FOREIGN PATENT DOCUMENTS

| | | |
|---|---|---|
| 2137256 | 12/1993 | (CA) . |
| 4224 690 | 1/1974 | (DE) . |
| 0126714 | 11/1984 | (EP) . |
| 0678326 | 10/1995 | (EP) . |
| WO 80/00310 | 3/1980 | (WO) . |
| WO 93/24212 | 12/1993 | (WO) . |
| WO 93/24419 | 12/1993 | (WO) . |

\* cited by examiner

*Primary Examiner*—Ana Fortuna
(74) *Attorney, Agent, or Firm*—Pillsbury, Madison & Sutro LLP

(57) ABSTRACT

The water treatment apparatus utilizes membrane separation technology to separate clean product water from a contaminated water source. Chemical pretreatment of the raw feed water, chemical cleaning of the membrane separator(s), and chemical treatment of the final recovered product water required by conventional membrane separation apparatus are eliminated in the water treatment apparatus. The water treatment apparatus may treat raw feed ground water and surface water sources as well as waste water sources including those exhibiting oily wastes, high metal levels, organic wastes from sources such as textile processing, sewage waste streams, food processing, and others. The water treatment apparatus also reduces the problems associated with recirculation of the waste stream, reduces water wastage, and provides advantages in power and horsepower requirements. The water treatment apparatus comprises an external pressurized raw water source, a raw water inlet, a raw water filter, a main drive pump, a valve arrangement, water treatment means, an inverse flush system having a product accumulator tank and a inverse flow pump, a pair of separation tanks, a recirculation pump set, treated water output storage means, an external fast flush water supply, and a waste water discharge. Ducting connects these components and communicates water therebetween.

16 Claims, 23 Drawing Sheets

U.S. PATENT DOCUMENTS

| | | |
|---|---|---|
| 5,112,489 | 5/1992 | Hartmann . |
| 5,131,277 | 7/1992 | Birdsong et al. . |
| 5,139,678 | 8/1992 | Frederick, Jr. et al. . |
| 5,178,766 | 1/1993 | Ikeda et al. . |
| 5,285,903 | 2/1994 | Sorenson et al. . |
| 5,399,263 | 3/1995 | Chomka et al. . |
| 5,484,529 | 1/1996 | Malugade et al. . |
| 5,500,113 | 3/1996 | Hartley et al. . |
| 5,647,973 | 7/1997 | Desavlniers . |
| 5,690,829 | 11/1997 | Lauer . |
| 5,795,474 * | 8/1998 | Haney ............................. 210/257.1 |

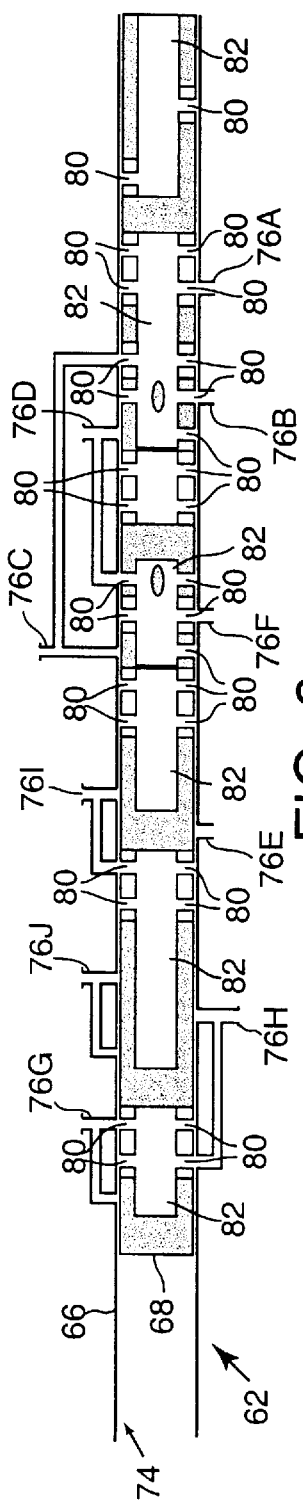
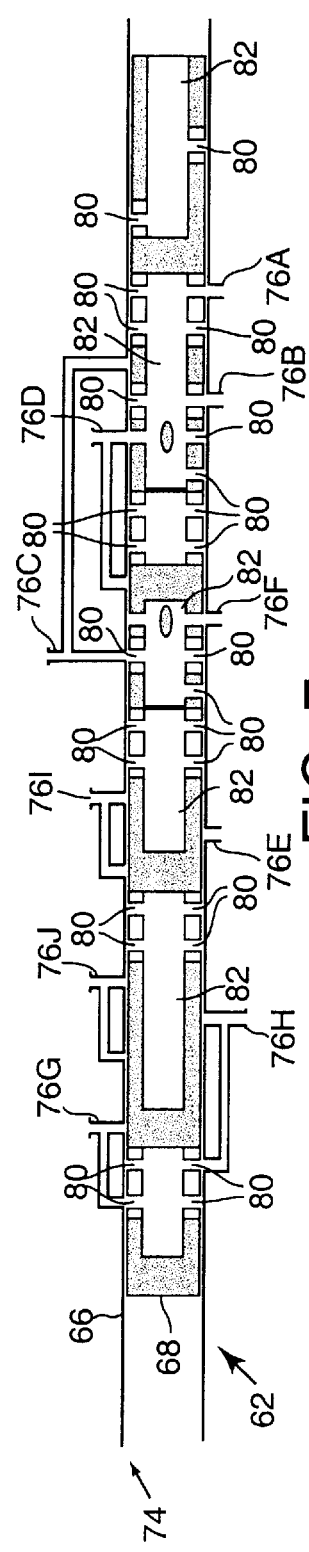
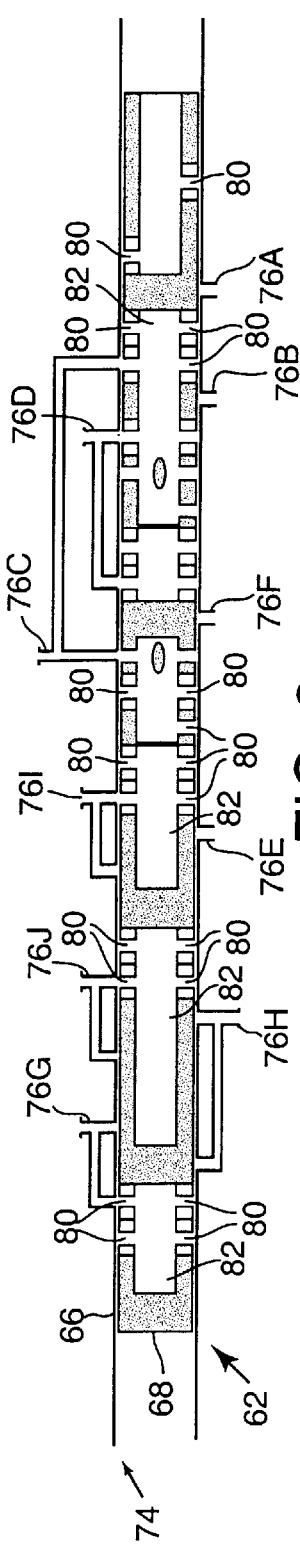

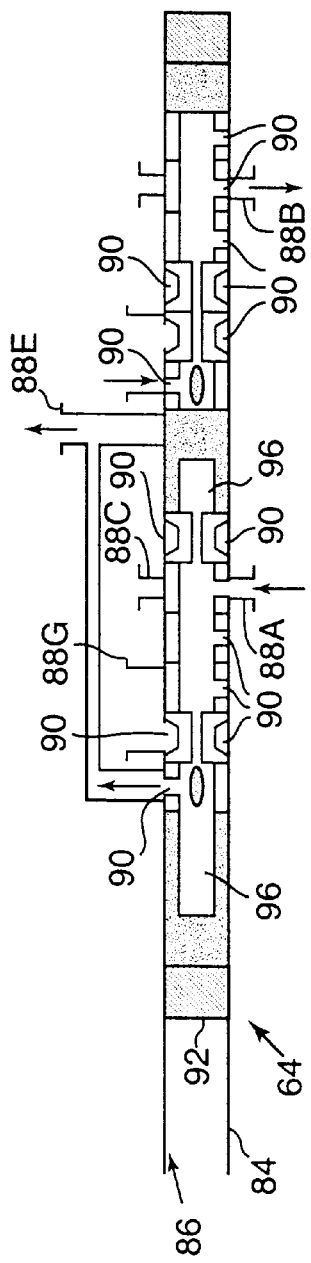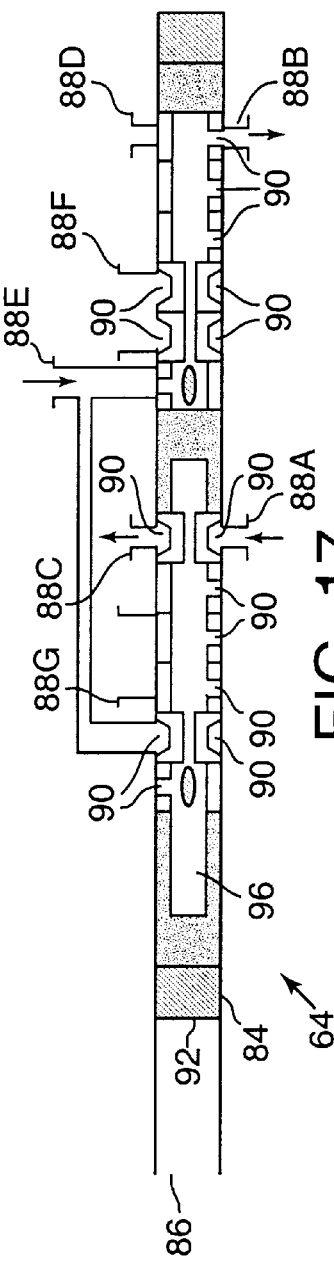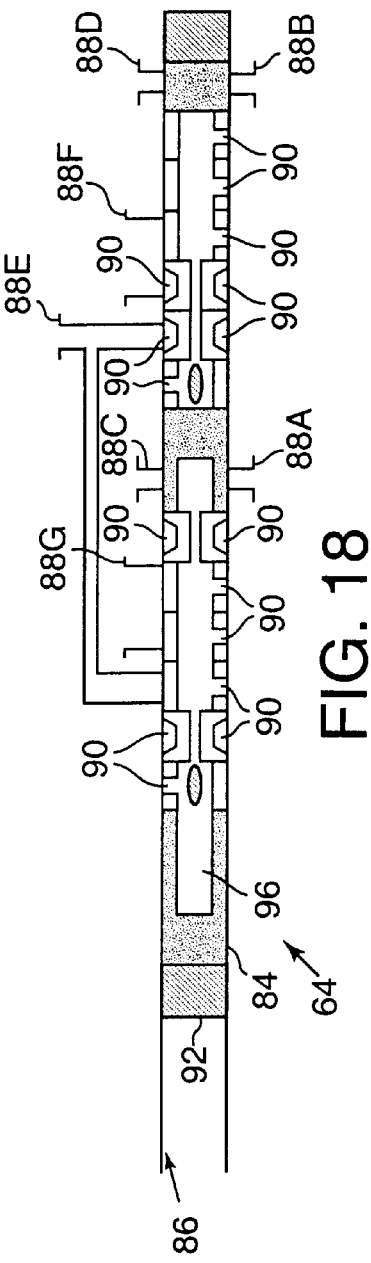

WATER TREATMENT SYSTEM

This application is a continuation-in-part of application Ser. No. 08/655,774 filed May 5, 1996 and now issued as U.S. Pat. No. 5,795,476 and is a continuation-in-part of application Ser. No. 08/762,668 filed Dec. 9, 1996, pending.

FIELD OF THE INVENTION

The present invention relates to water treatment systems of the type utilizing reverse osmosis and/or nano-filtration thin film membrane separation technology.

A coarse filter B is placed prior to the conventional membrane separation device to separate large solids that might interfere with or damage subsequent pumps and/or membranes.

Pre-treatment apparatus C and devices are then placed to remove dissolved ions, polar contaminates and/or suspended contaminates that might cause damage to, or prevent the efficient operation of, the membrane separator. A partial list of common devices now used with conventional membrane separation technology, chemicals used, costs associated with the pre-treatment devices and the contaminates that they are designed to remove is shown below.

| DEVICE | CHEMICALS USED | COSTS | CONTAMINATES REMOVED |
|---|---|---|---|
| MANGANESE GREENS AND IRON FILTERS | POTASSIUM PERMANGANATE | MEDIA REPLACEMENT, MECHANICAL UP-KEEP CHEMICAL FEEDS WATER WASTAGE | IRON, MANGANESE |
| ACIDIFICATION | HYDROCHLORIC ACID, SULPHURIC ACID, PHOSPHORIC ACID | ACID FEED MECHANICAL UPKEEP | NONE, ALLOWS OPERATION ON HARD WATER |
| CHLORINE/SAND FILTRATION IRON FILTERS | CHLORINE COMPOUNDS | MECHANICAL UP-KEEP, MEDIA REPLACEMENT, CHEMICAL FEEDS WATER WASTAGE | IRON, MANGANESE, BACTERIA, SOME ORGANICS |
| DECHLORINATION EQUIPMENT | ACTIVATED CARBON, SODIUM THIOSULPHITE FEED | MEDIA REPLACEMENT, CHEMICAL FEEDS, WATER WASTAGE MECHANICAL UP-KEEP | CHLORINE, OZONE, SOME ORGANICS |
| OZONATION | DESICCANTS, OZONE | DESICCANT UP-KEEP, MECHANICAL UP-KEEP | IRON, MANGANESE, SOME ORGANICS, COLOR |
| OZONE DESTRUCT SYSTEMS | MEDIA SYSTEM | MEDIA REPLACEMENT, MECHANICAL UP-KEEP | OZONE |
| SAND FILTERS | NONE | MEDIA REPLACEMENT, MECHANICAL UP-KEEP | SUSPENDED SOLIDS, PARTICULATES, TURBIDITY |
| WATER SOFTENER ION EXCHANGER | SODIUM CHLORIDE SALT, POTASSIUM CHLORIDE SALT | SALT FEED, MEDIA REPLACEMENT, MECHANICAL UP-KEEP | CALCIUM, MAGNESIUM HARDNESS |
| ORGANIC SCAVAGING ION EXCHANGER | SODIUM CHLORIDE SALT, CAUSTIC SODA | SALT FEED, CAUSTIC FEED, MEDIA REPLACEMENT, MECHANICAL UP-KEEP | SOME ORGANICS, SOME FORMS OF SILICA, COLOR, SULPHATES |
| SODA ASH/LIME EXCHANGE SOFTENERS | SODA ASH, SODIUM CARBONATE | SODA ASH FEED, SODIUM CARBONATE FEED MECHANICAL UPKEEP FILTER BED UPKEEP TURBIDITY MEDIA REPLACEMENT | CALCIUM, MAGNESIUM HARDNESS, SUSPENDED SOLIDS, PARTICULATES, |

BACKGROUND

Apparatus for treating water and/or wastewater which utilize conventional membrane separation technology incorporating reverse osmosis and/or nano-filtration thin film membrane separation technology are well known and have been commercially available for many years. One example of an apparatus utilizing conventional membrane separation technology is shown in FIG. 1, defined hereafter, and outlined in general terms below.

Conventional membrane separation technology generally incorporates the following processes.

A raw (untreated) water source A is directed to the inlet of the conventional membrane separation device in either a flooded suction condition or under pressure by either a raw feed booster pump or via gravity feed.

Fine polishing filters D, generally of the disposable cartridge type, are provided with smaller systems and/or automated sand filter/coagulant systems are provided with larger systems and follow the pretreatment package. The purpose of this is to provide both filtration to below 15 microns and a silt density index (SDI) of below 5. These are the maximum levels normally acceptable with conventional membrane separation technologies.

A raw feed water shut-off valve E, usually automatic and controlled by the membrane separator device, is normally incorporated in order to prevent raw feed water from entering the membrane separator device when not in operation.

A raw feed water system pressure boost pump F or boost pump set is arranged following the shut-off valve to increase the pressure of the raw feed water to an acceptable level above the osmotic pressure of the raw feed water solution. Operating pressures vary from device to device. In general, the higher the total dissolved solids level of the raw feed water solution to be treated, the higher the operating pressure of the device. Common operating pressures are shown below.

| FEED SOLUTION OPERATING | TOTAL DISSOLVED SOLIDS RANGE | TYPICAL PRESSURE RANGE |
|---|---|---|
| LOW SALINITY | 0 to 1,000 mg/l | 60 to 150 psi |
| SLIGHTLY BRACKISH WATER | 1,000 to 5,000 mg/l | 150 to 250 psi |
| MODERATELY BRACKISH | 5,000 to 10,000 mg/l | 250 to 550 psi |
| HIGHLY BRACKISH WATER | 10,000 to 25,000 mg/l | 450 to 850 psi |
| SEA WATER | 25,000 to 38,000 mg/l | 800 to 1,150 psi |
| EXTREME SALINITY | 35,000 to 50,000 mg/l | 900 to 1,850 psi |

As higher operating pressures improve both the product water output of membrane separators operated in the conventional manner and the product water quality, higher pressures than those indicated for the level of dissolved solids present in the raw feed water are sometimes used, but operating at higher pressures results in higher operating costs per volume of product water recovered.

The raw feed water system pressure boost pump or pump set must produce both the pressure required to operate the membrane separator and the required flow as well. Most conventional membrane separator specifications will only allow 10 to 15% recovery of the raw feed water stream if rated membrane service life, final water quality parameters and membrane warranty conditions are to be met. Some conventional membrane separator system designs do not follow these specifications, but this is bad practice.

Pump/motor combinations may include air-cooled motors with positive displacement pumps, single stage centrifugal pumps, or multi-stage centrifugal pumps, or water-cooled submersed motors with multi-staged centrifugal pumps. Average motor efficiencies for these pump designs are as follows.

| | |
|---|---|
| Air-Cooled Motor, Positive Displacement Pump | 55% |
| Air-Cooled Motor, Centrifugal Pump | 60% |
| Water Cooled, Submersed Motor, Centrifugal Pump | 75% |

The majority of conventional membrane separator designs operate with air-cooled motors. These are the least efficient and heat generated by the motor is lost to the atmosphere.

In order to meet the membrane separator warranty specifications, the system pressure booster pump/pump set must be capable of producing no less than 8, but preferably 10, times the anticipated flow of final recovered product water. The excess water may be discharged, creating a very water wasteful situation, or be partially recycled. In either case, the raw feed water main drive pump(s) must be capable of pressurizing the same volume of water. This involves considerable horsepower as shown below.

| | FULL RECIRCULATION | NO RECIRCULATION |
|---|---|---|
| CONDITION: | SEA WATER, 30,000 TDS | SEA WATER, 30,000 TDS |
| OPERATION PRESSURE: | 850 PSI | 850 PSI |
| REQUIRED PRODUCT WATER FLOW: | 1 USGPM | 1 USGPM |
| REQUIRED MEMBRANE TOTAL: | 10 USGPM | 10 USGPM |
| FEED FLOW | | |
| TOTAL MAIN DRIVE PUMP FLOW | 10 USGPM | 10 USGPM |
| RECIRCULATION FLOW: | 8 USGPM | 0 USGPM |
| WASTE FLOW: | 1 USGPM | 9 USGPM |
| HORSEPOWER FORMULA: | | |

$$\frac{\text{TOTAL MAIN DRIVE} \times \text{PRESSURE PUMP FLOW}}{\text{MOTOR HORSEPOWER FACTOR}} = \frac{\text{THEORETICAL HORSEPOWER MOTOR EFFICIENCY}}{} = \text{REQUIRED HORSEPOWER}$$

Therefore, under the above conditions, the horsepower requirements of a membrane separator operating in a conventional manner with an air-cooled motor and centrifugal pump would be:

$$\frac{10 \times 850}{1560} = \frac{5.45}{0.60} = 9.08 \text{ Horsepower Per Gallon Per Minute Produced}$$

A Membrane Housing G accepts the flow from the raw feed water system pressure booster pump. The typical membrane housing feeds one or more membrane separators H, placed in series, within the housing with raw water from one end only, and in one direction only. The raw feed water is fed directly at the end of the membrane separator placed first within the housing. Brine seals (generally of a "U"-cup design) are placed on each membrane separator element within a series feed housing set, generally at the feed end. The brine seals prevent the flow of raw feed water around the membrane separator and force the water through the membrane separator feed spacers. This causes a jetting effect against the feed side of the membrane, potentially causing premature membrane wear and channeling.

Waste water is discharged from the membrane feed spacers at the end of the membrane separator opposite the feed end. The membrane separator arranged last in the series receives more concentrated feed water since the membrane separators arranged earlier in the series extract water from the feed water solution. This increases the concentration of contaminants in the feed water as it passes through each separator which in turn causes premature wear on the membranes placed last in series. This problem is further exacerbated if a membrane separator design incorporates an array lay-out.

The membrane separators are periodically flushed to remove particulates, solids and sludge present in the feed spacers within the membrane separators. When flushing multiple membrane separators arranged in series, flushing occurs in the same direction as operational flow. This minimizes the effectiveness of the flushing operation, particularly the flushing of the middle and final membrane separators since particulates, solids and sludge present in the feed spacers of earlier membrane separators are forced into the feed spacers of subsequent membrane separators. Flushing also cannot remove solids, sludges or other materials that may coat the membrane surface. This is particularly a problem if the membrane separator design incorporates an array lay-out.

Membrane selection is dependent upon the raw feed water conditions and final product water quality and quantity desired. All conventional membrane separators incorporate either diamond feed spacers or parallel feed spacers. These conventional feed spacers create a space between adjacent portions of the membrane and allow water to flow over the adjacent portions. Particulates passing along the feed spacers tend to get trapped causing plugging of the membrane separator.

The trapping of particulates within the feed spacers presents a recovery problem for conventional membrane separator designs. Recovery is the amount of water removed from the raw feed water. The resultant concentrated waste stream is the final volume of water remaining from the raw feed stream once the membrane separator has extracted a given product water volume. If, for example, 100 gallons of raw feed water enter the conventional membrane separator system and 50 gallons are removed as product water, 50 gallons of concentrated waste remains as the waste discharge stream. This equates to 50% recovery.

Ions present in the raw feed water are initially dissolved in solution, but as water is extracted from the raw feed water stream the volume of raw water remaining decreases. If the contaminating ions are too concentrated in the remaining volume (in excess of the Ksp of the solution), some will fall out of solution within the membrane feed spacer structure and will cause membrane fouling by coating the membrane separator thin-film surface itself or plugging of the membrane separator feed spacers, preventing that section of the membrane separator from producing product water. This may be especially dangerous in the case of conventional membrane separators if the contaminates leaving the dissolved state consist of iron, manganese, organics or oils. This problem is especially evident with array designs where high recoveries are attempted.

A membrane waste outlet pressure control valve I is utilized to control back-pressure against the membrane separator and to control the volume of waste discharge water leaving the conventional unit.

Often, in order to reduce the membrane separator water wastage, a recirculation valve J is incorporated. The recirculation valve directs a selected portion of the waste stream from the membrane separator, prior to its exiting through the membrane waste outlet/system pressure control valve, back to the raw feed water system pressure boost pump inlet. This water is retained within the system but must be repressurized to the system operating pressure before being returned to the membrane separators. Although this methodology reduces water wastage, no advantages are gained in power or horsepower reduction.

The returned water from the concentrate waste outlet that is recirculated will be higher in total dissolved solids than the incoming raw water and will contain concentrated levels of any contaminates present in the raw incoming water stream. This must be taken into account when determining the fouling characteristics of membrane separators operated in the conventional manner.

Most conventional membrane separator designs incorporate either an automated or manual membrane separator fast flush valve K. This valve allows raw water, or an external fresh water source, to be sent at full pump velocity through the membrane separator feed spacers to assist in dislodging materials that have been caught within the membrane separator feed spacers. Membrane separator flushing is in a single direction only and is not highly effective.

Optional membrane chemical feed tanks L are sometimes included as clean in place additions within the conventional membrane separator design to provide for chemical cleaning of the membrane separator(s) once they have become fouled or coated.

Chemical treatment M of the final recovered product water is often necessary with conventional membrane separation technologies, especially if acid feed strategies are utilized as part of the pre-treatment method. The final product water produced by conventional membrane separation technologies is, generally, very aggressive and unsuitable for most domestic purposes and distribution piping.

The currently available conventional membrane separator apparatus have many undesirable characteristics. Of these undesirable characteristics, the most undesirable are:

a) the low life expectancy of membrane separators operated in the conventional manner due to chemical cleaning requirements and pretreatment failures as well as normal wear;

b) the accelerated wear of membrane separators placed last in series feed configurations due to higher total dissolved solids/contaminate loading as the feed solution becomes more concentrated from the membrane separators placed earlier in series extracting product water from the solution;

c) the accelerated wear of the membrane separators from continuously experiencing solids and sludges re-introduced into the feed water with the recirculated concentrated waste from the membrane separators themselves, as this recirculated concentrated waste stream reenters the raw feed water booster pump and then directly re-enters the membrane separators;

d) the accelerated wear of each first membrane separator placed within a series feed housing due to the jetting of the pressurized and high velocity feed water stream, which often contains abrasive solids from either the raw water stream itself or the recirculated water stream, directly against these first membrane separators placed in series;

e) the accelerated wear and plugging of the membrane separators because the conventional membrane separator feed spacer design promotes retention and accumulation of solids, sludge and contaminates that fall out of solution due to super-saturation;

f) the accelerated wear and plugging of conventional membrane separators from single direction flow, single direction and inefficient flushing of the feed spacers and thin-film surface;

g) the high power requirements and operating costs associated with the conventional membrane separator device's raw feed water pressure booster pump and waste recovery/recirculation design;

h) the significant manpower expenditures and associated operating costs relating to pre-treatment requirements of a membrane separator design operated in the conventional manner;

i) the significant costs associated with pre-treatment chemicals and operation of pre-treatment equipment necessary with conventional membrane separator designs;

j) the severe damage caused to membrane separators operated in the conventional manner when pre-treatment devices and/or chemical feed strategies fail;

k) the damage caused to membrane separators operated in the conventional manner when raw feed water conditions change and cause the pre-treatment strategy to be no longer effective;

l) the high costs associated with on-going up-grades of the pretreatment equipment/strategy as raw feed water conditions change;

m) the potential poisoning of the final recovered product water if pre-treatment chemicals infiltrate the product stream due to membrane separator failure, membrane separator seal failure or membrane separator product core plug/seal failure;

n) the significant chemical cleaning requirements necessary when operating membrane separation technology in the conventional manner in order to remove accumulated coating from the thin-film surface;

o) the problems associated with disposal of the concentrated waste water from membrane separators operated with pre-treatment; and, p) the loss of membrane life expectancy and reduced membrane effectiveness each time a membrane separator is chemically cleaned in the conventional manner. One to five percent of the initial membrane separator output capability may be lost during each cleaning cycle.

Some other disadvantages related to the use of conventional membrane separation technology are outlined below.

Operation of a conventional water treatment apparatus utilizing membrane separation technology has very high costs associated with it which often makes it economically unviable. These costs are due to the very high electrical operating costs, the very high costs and complicated operating procedures associated with substantial and complex pre-treatment equipment, and the very high costs associated with membrane separator element replacement when the membrane separators become fouled, plugged or prematurely damaged from inefficient flushing, necessary chemical cleaning procedures and/or over-all inefficient operation. In the event of pre-treatment failure, especially if high strength oxidants such as potassium permanganate, ozone or chlorine compounds are allowed to enter the membrane separator due to such a failure, total membrane destruction will often occur.

Membrane separators operated in the conventional manner together with necessary pre-treatment equipment and/or chemicals dictate that all feed water must be pre-treated. This entails the often excessive cost of treating the volume of water that is ultimately directed to final waste discharge as well as the volume of final recovered product water. In situations where the membrane separator is operating at fifty percent recovery, or less, pre-treatment devices and/or chemicals must be fed at more than twice the rate necessary for the actual usable product water produced, creating very high pre-treatment costs.

Pre-treatment presents a major disadvantage in final recovered product water quality. The most common forms of pre-treatment, such as water softeners and soda ash/lime softening, result in the exchange of monovalent ions (such as sodium, potassium and chloride) for the unacceptable ions that must be removed from the feed water of conventional membrane separator systems such as calcium, sulphate, magnesium, iron, manganese, silica, organic complexes, etc. Conventional membrane separators are very effective at removing calcium, sulphate, silica, etc., but less effective at removing sodium, chloride and potassium. If the raw feed water did not require pre-treatment, the resulting total dissolved solids levels and sodium, chloride and/or potassium levels of the final recovered product water would be lower.

Environmental disadvantages are numerous. Waste discharge streams must be disposed of. In many cases where membrane separation technology is applied in the conventional manner and pre-treatment devices and/or chemical feed pre-treatment strategies are applied, the waste discharge stream from the membrane separator may become toxic or hazardous. The sole reason for the toxicity or hazardous nature of the waste discharge stream may be due to the pre-treatment devices and pre-treatment chemical feeds themselves. Wastes produced during cleaning of membrane separators operated in the conventional manner are often toxic and, generally, never regarded as acceptable for discharge without special handling or treatment.

Membrane separators operated in the conventional manner are very water wasteful as frequent high volume raw water fast-flush cycles are necessary in order to help dislodge solids and sludge caught within the feed spacers and accumulated on the membrane separator thin-film surface. This presents both environmental concerns relating to the discharge of high volume waste streams and concerns over the depletion of the raw water supply.

Pre-treatment chemicals become concentrated in waste discharge streams from conventional membrane separator systems, often at levels above environmentally acceptable discharge standards. If pre-treatment chemicals were not necessary, the resulting waste discharge stream would be less problematic and more easily disposed of.

Safety disadvantages and concerns are also numerous with membrane separators, operated in the conventional manner, utilizing pre-treatment devices and/or chemical feed pre-treatment, especially when the intended use of the final recovered product water is for potable water purposes. The chemicals used as pre-treatment, such as potassium permanganate, many descalents, acid feeds and aluminum compounds are toxic and not acceptable for human consumption. In the event of a membrane breach, bypass or failure, these chemicals can enter and poison the final product water and any water stored in a product water reservoir.

Health disadvantages, especially with membrane separators operating in the conventional form for the purpose of producing potable water, can arise from the very aggressive nature of the final product water recovered. The final product water recovered typically exhibits a very low pH, very little buffering capacity, and little more than sodium and chloride as dissolved ions. This water will readily dissolve metals that it comes into contact with. This can be especially problematic in distribution systems and domestic residences where iron (from steel distribution piping), copper and brass (from both distribution piping and household plumbing) and even lead may be dissolved, rendering the water unsuitable for potable use.

One further health disadvantage with membrane separator technologies utilizing pre-treatment where the final recovered product water is intended for use as potable water is directly a result of the pre-treatment itself. Because the sodium levels of the raw water stream are elevated by most forms of pre-treatment and because sodium is amongst the most difficult ions for membrane separators to remove, the sodium levels of the final product water recovered is virtually always above the recommended potable water limit of 20 milligrams per liter (mg/l) or 20 parts per million (ppm) for those on sodium restricted diets and very often above the maximum recommended limit of 80 mg/l for the general population.

Nested valve sets used in conventional membrane separator designs present extreme disadvantages. Nested valve sets require high maintenance, present complex and considerable control problems, and are also very expensive. Failure of a valve within a nested valve set, or incorrect positioning for any reason including incorrect valve programming, can cause rapid and/or immediate failure of the membrane separator itself, failure of other system components, contaminated final recovered product water, and other severe problems.

SUMMARY OF THE INVENTION

It is one object of the present invention to provide a water treatment apparatus and a valve therefor which improves the operation of the control of the water flow and simplifies the construction of the apparatus.

According to the present invention there is provided an apparatus for treating water from a water supply comprising:

a water supply inlet;

a treatment reactor having a housing, a membrane within the housing, a first port, a second port, and a third port in the housing, said treatment reactor being arranged such that a supply stream from the supply inlet fed to one of the first and second ports passes over the membrane to form a waste stream at the other of the first and second ports while consumption water passes through the membrane to the third port so that the waste stream contains an increased level of contaminants relative to the supply stream and the consumption stream;

a storage tank for receiving and storing consumption water from the third port;

a pump for pumping water through the reactor to said one of the first and second ports;

ducting connecting the water supply inlet to the pump, the pump to the treatment reactor, and the treatment reactor to the storage tank and communicating a flow of water therebetween;

and a valve for use in controlling flow of the water through the ducting;

said valve comprising;

a valve body;

a plurality of ports in the valve body for connection to the ducting, each port having a channel extending into the valve body for communication of water thereto;

a cylindrical bore arranged along an axis of the valve body such that each said channel extends through the valve body to the bore defining an opening at the bore;

a valve member having a cylindrical outer surface arranged as a sliding fit within the bore and movable longitudinally in the valve body and arranged relative thereto so as to provide a plurality of longitudinally spaced positions for controlling water flow between selected ports;

and control means for selectably moving the valve member between the plurality of longitudinally spaced positions thereby controlling water flow through the ducting.

Preferably the cylindrical outer surface of the valve member includes a plurality of axially spaced annular recesses arranged to communicate water longitudinally of the valve body between respective ones of the openings.

Preferably the valve has an interior channel therealong for communicating fluid between spaced ports thereof the channel being maintained separate from ports intermediate the spaced ports.

Preferably the interior channel extends along the valve member.

Preferably the interior channel extends along the valve body.

Preferably the valve body is formed from a plurality of axially separated, coaxial portions, each separated from and clamped to the next at an end face of the portion lying in a plane radial to the axis.

Preferably the portions are clamped together by clamping rods extending along the length of the valve body.

Preferably each portion includes a single one of the ports.

Preferably each portion includes a plurality of dowel rods projecting from a face thereof for engagement into a corresponding receptacle of the next adjacent portion.

Preferably each portion includes a plurality of dowel rods projecting from a face thereof for engagement into a corresponding receptacle of the next adjacent portion, each dowel rod having a central bore through which the clamping rod passes.

Preferably each portion has at the end face thereof a part of a groove at the cylindrical bore thereof such that when the end faces are clamped together the parts of the groove are aligned to cooperate to define an annular O-ring groove for containing an O-ring for surrounding and sealing against the outer surface of the valve member.

Preferably the O-ring groove has axially spaced side walls between which the O-ring is received, each side wall having a lip at the cylindrical bore extending axially from the side wall such that the space between the lips at the bore is less than the space between the side walls at a position spaced from the bore so as to act to retain the O-ring in the groove.

Preferably the space between the lips is less than the diameter of the cross-section of the O-ring.

Preferably the space between the side walls is less than the diameter of the cross-section of the O-ring.

Preferably each lip is defined by a wall which is inclined at an angle to the radial plane and extends to an apex at the bore.

According to a second aspect of the invention there is provided a valve comprising;

a valve body;

a plurality of ports in the valve body, each port having a channel extending into the valve body for communication of water thereto;

a cylindrical bore arranged along an axis of the valve body such that each said channel extends through the valve body to the bore defining an opening at the bore;

a valve member having a cylindrical outer surface arranged as a sliding fit within the bore and movable longitudinally in the valve body and arranged relative thereto so as to provide a plurality of longitudinally spaced positions for controlling water flow between selected ports;

control means for selectably moving the valve member between the plurality of longitudinally spaced positions thereby controlling water flow through the ducting;

an annular O-ring groove on the inner bore of the valve body for containing an O-ring for surrounding and sealing against the outer surface of the valve member;

the O-ring groove having axially spaced side walls between which the O-ring is received, each side wall having a lip at the cylindrical bore extending axially from the side wall such that the space between the lips at the bore is less than the space between the side walls at a position spaced from the bore so as to act to retain the O-ring in the groove.

Preferably the valve body is formed from a plurality of axially separated, coaxial portions, each separated from and clamped to the next at an end face of the portion lying in a plane radial to the axis and wherein each portion has at the end face thereof a part of a groove at the cylindrical bore thereof such that when the end faces are clamped together the parts of the groove are aligned to cooperate to define said annular O-ring groove for containing said O-ring for surrounding and sealing against the outer surface of the valve member.

BRIEF DESCRIPTION OF THE DRAWINGS

In the accompanying drawings, which illustrate an exemplary embodiment of the present invention:

FIG. 6 is a schematic of the main valve showing the main valve in the first position.

FIG. 7 is a schematic of the main valve showing the main valve in the second position.

FIG. 8 is a schematic of the main valve showing the main valve in the third position.

FIG. 16 is a schematic of the sequencing valve showing the sequencing valve in the fourth position.

FIG. 17 is a schematic of the sequencing valve showing the sequencing valve in the fifth position.

FIG. 18 is a schematic of the sequencing valve showing the sequencing valve in the sixth position.

DETAILED DESCRIPTION

The water treatment apparatus described below utilizes membrane separation technology but does not require any form of chemical pretreatment of the raw inlet water or chemical cleaning of the membrane separators. The water treatment apparatus without chemical pretreatment when treating raw feed ground water and surface water sources as well as waste water sources including those exhibiting oily wastes, high metal levels, organic wastes from sources such as textile processing, sewage waste streams, food processing, and others.

Figure 1:
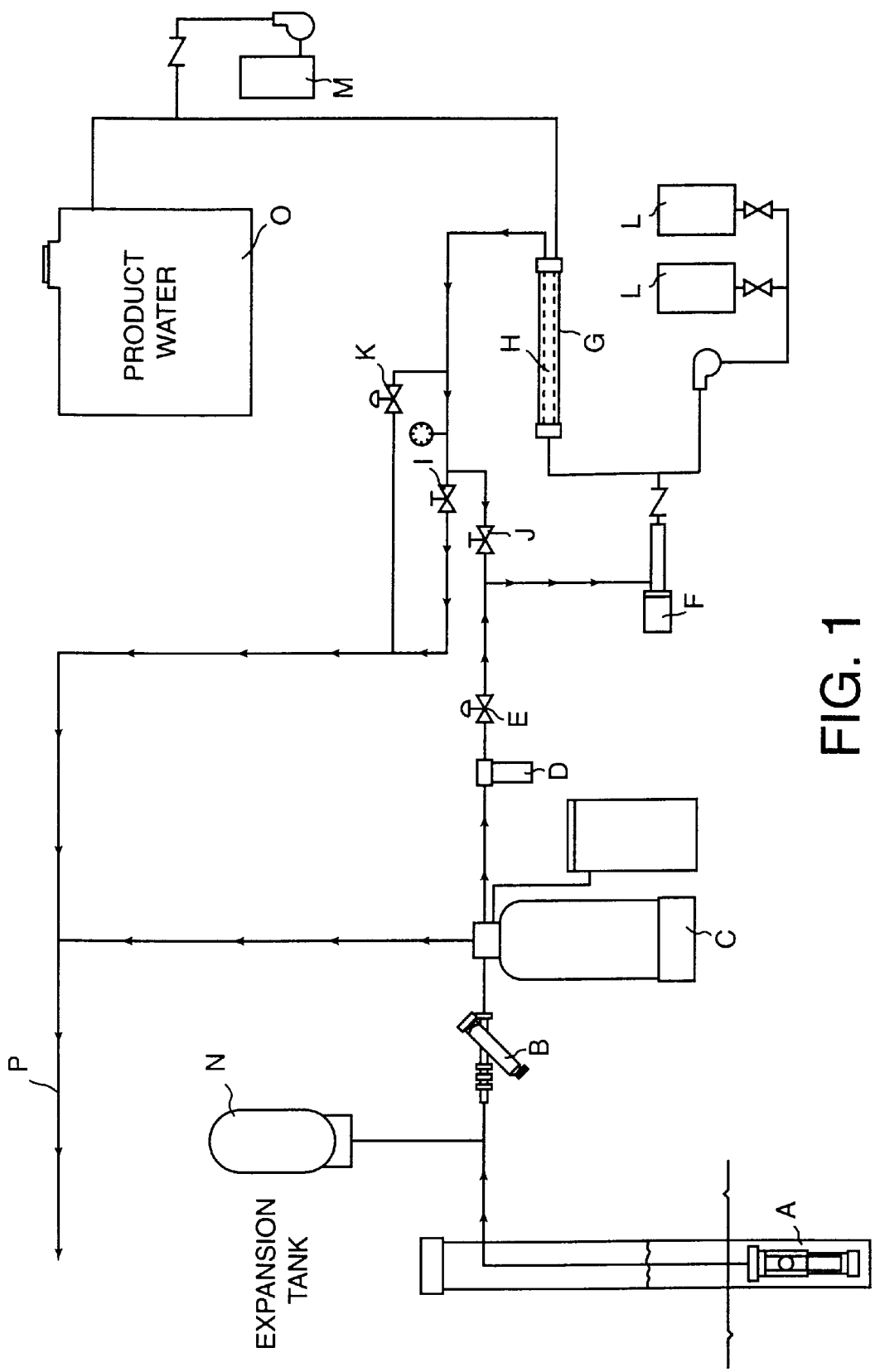
FIG. 1 is a schematic of a conventional water treatment apparatus utilizing membrane separation technology.
Figure 2:
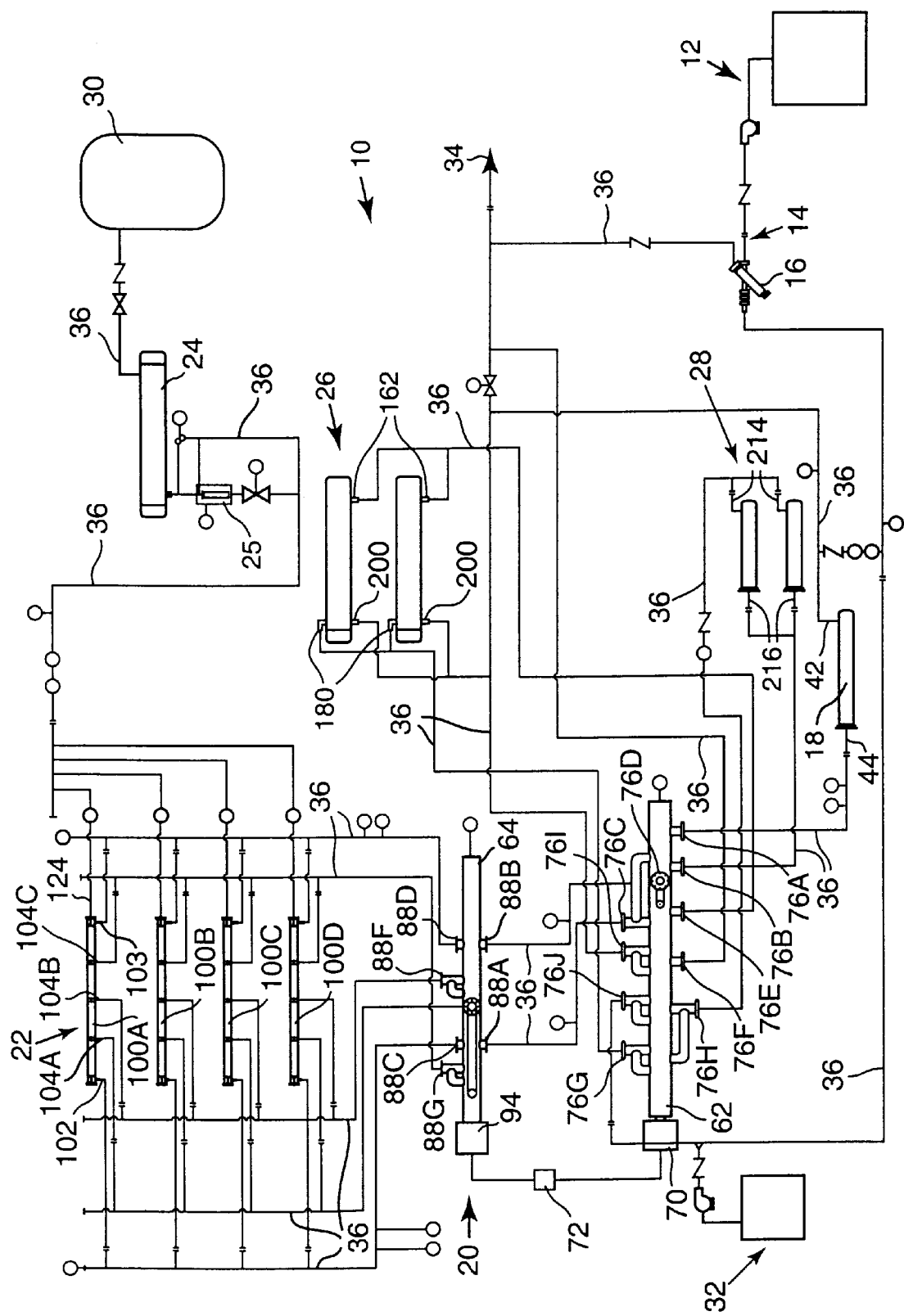
FIG. 2 is a schematic of the water treatment apparatus of the present invention.

Referring to FIG. 2 the water treatment apparatus is shown generally at 10. The water treatment apparatus 10 comprises an external pressurized raw water source 12, a raw water inlet 14, a raw water filter 16, a main drive pump 18, a valve arrangement 20, water treatment means 22, an inverse flush system having a product accumulator tank 24 and a inverse flow pump 25, a pair of separation tanks 26, a recirculation pump set 28, treated water output storage means 30, an external fast flush water supply 32, and a waste water discharge 34. Ducting 36 connects these components and communicates water therebetween.

The raw water source 12 supplies pressurized raw water to the raw water inlet 14 to be treated by the water treatment apparatus 10. The raw water supply 12 generally provides raw ground water, raw surface water, and/or contaminated water to the treatment apparatus 10. These waters generally contain suspended and dissolved materials, and various chemical and biological contaminates which make the water unpotable or otherwise unusable. The raw water source 12 is usually pressurized by a gravity feed, such as a water tower, or by various pump arrangements to provide water in a condition of flooded suction or other positive pressure to the water treatment apparatus 10. The water supply inlet 14 receives raw water from the raw water supply 12 and communicates it via the ducting 36 to a filter 16.

The filter 16 is generally a course solid screened filter which removes particulates and solids from the feed water stream. The filter 16 is arranged between the raw water source 12 and the water treatment means 22 in order to eliminate particulates and solids larger that 100 microns from the feed water stream. The removal of these particulates and solids prevents damage to the main drive pump 18 and the recirculation pump set 28. Reduction of turbidity, silt density index (sdi), and smaller solids is not necessary. Automatic back-flushing screen filters and similar filters which are currently commercially available may be used. If a back-flushing filter is used it may be cleaned by back-flushing of the filter screen. This may be initiated by pressure differential, pre-set time, or other common methods. The screen filter should be selected in order to minimize the waste water volume required for back-flush and the time required for back-flush. A preferred selection is the Amiad filter screen design.

Figure 3:
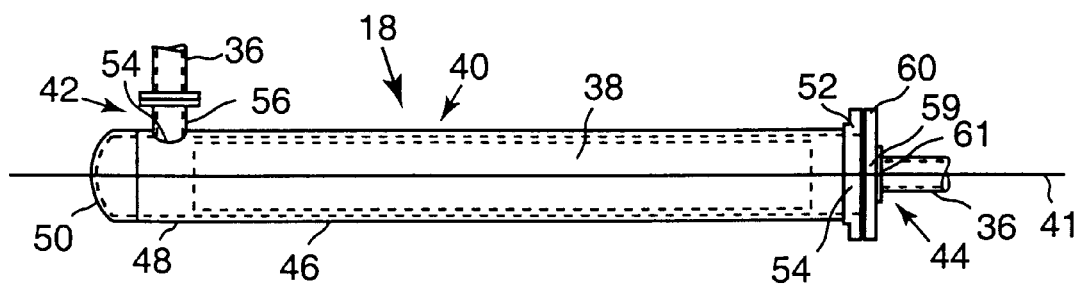
FIG. 3 is a side view of the main drive pump and pump housing.

Referring to FIGS. 2 and 3 the main drive pump 18 receives raw water from the filter 16 via the ducting 36 and increases the pressure of the raw feed water to the required operating pressure. The operating pressure must be at an acceptable level above the osmotic pressure of the raw feed water solution. This is necessary to enable the water treatment means 22 to overcome osmotic pressure and separate uncontaminated water from the contaminated raw water. The pump main drive pump 18 pressurizes the raw water to the desired operating pressure and pumps the water through the water treatment means 22 and throughout the rest of the water treatment apparatus 10 via the ducting 36.

Referring to FIG. 3 the main drive pump 18 comprises a water cooled submersible pump 38 arranged within a pump housing 40. The pump housing 40 includes an inlet port 42, and a outlet port 44. Raw and recirculated water enters the inlet port 42 and is pressurized by the submersible pump 38 where the water is pressurized to the required operating pressure. After being pressurized by the pump 38 the water then exits the housing 40 at the outlet port 44.

The submersible pump 38 is selected such that during normal operation it operates in a higher operating range than normal thereby producing excess heat. This excess heat is transferred to the water passing through the pump 38 thereby cooling the pump and raising the temperature of the water exiting through the outlet port 44 relative to the water entering the inlet port 42. The pump housing 40 and ducting 36 are made of a material selected such that it has good insulating properties to reduce heat loss. This may also be done by applying insulating material to the housing 40 and ducting 36.

The pump housing 40 comprises an elongate vessel 46 having an outer cylindrical wall 48, a first closed first end 50, a second end 52, and an opening 54 at the second end 52. The inlet port 42 is arranged adjacent the closed first end 50 and comprises an opening 54 through the outer cylindrical wall 48, and a fitting 56 arranged at the opening 54 for connecting to the ducting 36. The fitting 56 and opening 54 are arranged such that water entering the housing 40 does so at approximately 90° to the longitudinal axis 41 of the housing 40 and flows to the submersible pump 38

The second end 52 of the housing 40 includes the opening 54 and removable and reengageable closure means 60 for closing the opening 54. The opening 54 is sized to receive the pump 38 therethrough, thereby allowing for periodic removal of the pump 38 for replacement and maintenance. The closure means 60 comprises a sealed bolt plate sized to extend across the opening 54.

The outlet port 44 comprises an opening 59 through the closure means 60 and a fitting 61 connected to the ducting 36. The outlet port 44 communicates pressurized water exiting the pump housing 40 to the valve arrangement 20 via the ducting 36.

Figure 4:
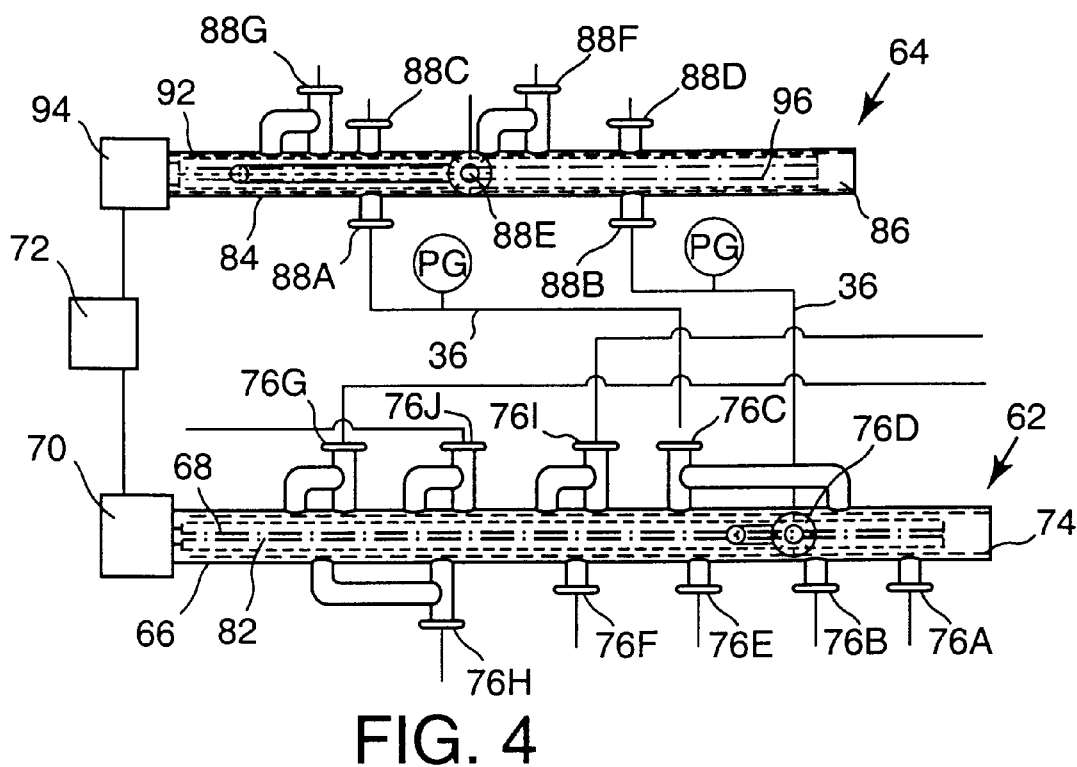
FIG. 4 is a schematic of the main valve and the sequencing valve.
Figure 5:
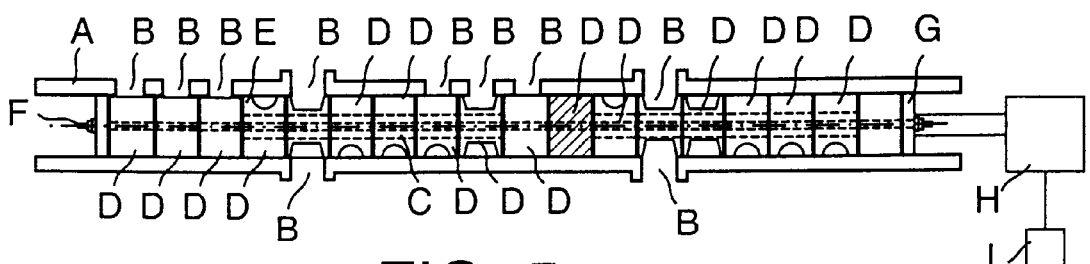
FIG. 5 is a cross sectional view of an ec valve.

Referring to FIGS. 2, 4, and 5 the valve arrangement 20 controls the flow of raw and recirculated water throughout the water treatment means 10. The valve arrangement 20 is arranged to selectively direct water through the water treatment means 22 in both the forward direction and the reverse direction providing for both forward and reverse operation of the apparatus 10 and of the membranes separators.

The valve arrangement 20 comprises a main process flow control valve 62 and a sequencing valve 64. The main process flow control valve 62 and the sequencing valve 64 are piston control valves known herein as ec valves (see U.S. patent application Ser. No. 655,774 of the present inventor). The main process flow control valve 62 and the sequencing valve 64 provide for full control of the processes involved with the invention and eliminate the need for nested motorized, hydraulic, pneumatic and/or other automated valve requirements which are used in conventional membrane separator designs.

EC valves are discussed generally below and an example, shown in FIG. 5, is used to illustrate the main components of an ec valve. The ec valve consists of a valve body A with inlet and outlet ports B for all devices incorporated within the water treatment apparatus and an internal piston C for controlling the flow of water to and from the ports B. The EC valve can be constructed in various sizes to accommodate the various large and small capacities available within the scope of the current invention, and may incorporate one or more pistons in one or more valve bodies. The valve body A may be formed from specially machined pipe with externally welded connections, cast two or more piece bodies with internal, and/or externally welded connections or a combination of both. The preferred embodiment utilizes either cast valve bodies with internal connections to the devices or specially machined pipe with externally welded connections. Materials of construction include, among other possibilities, stainless steel, aluminum, carbon steel, brass and various plastics.

The ec valve piston C may exist in several embodiments and may be constructed of individual machined segments D, in a single piece, or in several pieces. The piston C includes sealing means E which may be provided by o-rings, quad seals, or other sealing techniques. The piston segments D may be constructed of stainless steel, aluminum, carbon steel, brass, plastics or other materials.

The piston segments D are secured by a central rod F that is tightened at each end with threaded nuts or fasteners. The piston C is centered within the valve body by bearing plates G arranged at each end of the piston C, fixed or adjustable bearing plates supporting the central rod, or both. Materials of construction of the central rod F are stainless steel, aluminum or other ridged materials.

The central rod F provides a connection point for a valve actuator H. The valve actuator H moves the piston C within the valve body A aligning the piston segments with corresponding inlet and outlet ports B. The valve actuator H may be of a coupled motor/gear reducer type, electrically, hydraulically, or pneumatically actuated piston cylinder valve type, or any other drive motor/actuator type capable of forcing movement of the piston segments within the valve body.

The preferred materials of construction of the valve body A, central rod C, and piston segments D are either stainless steel, aluminum or both.

Movement of the piston C within the valve body A by the valve actuator H is usually regulated by a controller I such as a micro-processor, programmable logic controller, control computer, etc., in conjunction with limit switches and or valve positioning devices in order to ensure that the piston C movement within the valve body A is accurate and causes movement to the desired operating position.

Referring to FIGS. 2, 4, and 6 to 12, the main process flow control valve 62 is of the ec valve type and comprises a valve body 66, and a piston 68 movable within the valve body 66. The piston is movable to seven selectable positions providing different operating conditions. A valve actuator 70 and a control unit 72 selectably control the movement of the piston 68 within the valve body 66 between these selectable positions.

The valve body 66 comprises a cylindrical bore 74 extending through the valve body 66 and a plurality of ports 76A to 76J. Each port 76 comprises a channel through the valve body 66 defining an opening at the cylindrical bore 74. The ports 76 are spaced axially along the cylindrical bore 74 and are arranged to cooperate with axially spaced annular recesses and openings 80 arranged on the piston 68. The piston 68 has a cylindrical outer surface arranged in a sliding fit within the bore 74 and includes a channel 82 extending longitudinally along an interior thereof. The openings 80 communicate water between the channel 82 and corresponding ports 76 in the valve body 66.

The main process flow control valve 62 controls the flow of raw and recirculated water between the separation tanks 26, the recirculation pump set 28, the main drive pump 18, the external flush water source 32, the waste water discharge outlet 34, and the sequencing valve 64. The main valve 62 communicates the raw and recirculated water to the sequencing valve 64 which in turn controls the flow of the raw and recirculated water through the water treatment means 22.

The ports 76 on the main valve 62 are arranged as follows. The first port 76A connects the main valve 62 to the main drive pump 18 and receives contaminated raw and recirculated water from the main drive pump 18. The second port 76B connects the main valve 62 to the recirculation pump set 28 for receiving recirculated water from the recirculation pump set 28 and for merging it with the contaminated raw water from the main drive pump 18.

The third port 76C connects the main valve 62 to the first port 88A in the sequencing valve 64 and the fourth port 76D connects the main valve 62 to the second port 88B in the sequencing valve 64. The third and fourth ports 76C and 76D communicate fluid between the main piston valve 62 and the sequencing valve 64 in either a forward direction or a reverse direction. When operating in a forward direction water flows from the third port 76C in the main valve 62 to the first port 88A in the sequencing valve and from the second port 88B in the sequencing valve 64 to the fourth port 76D in the main valve 62. When operating in the reverse direction water flows from first port 88A in the sequencing valve 64 to the third port 76C in the main valve 62 and from the fourth port 76D in the main valve 62 to the second port 88B in the sequencing valve 64. The main valve 62 thereby controls the direction of flow of raw and recirculated water through the sequencing valve 64 and the water treatment means 22.

The fifth port 76E connects the main valve 62 to the flush/waste water discharge outlet 34.

The sixth port 76F connects the main valve 62 to the inlet ports 162 of the separation tanks 26. The seventh port 76G connects the main valve 62 to the outlet ports 180 of the separation tanks 26. The sixth and seventh ports enable the main valve 62 to communicate concentrated contaminated water from the water treatment means 22 to the separation tanks 26 and to receive water for recirculation.

The eighth port 76H connects the main valve 62 to the recirculation pump set 28 inlet port 214 for repressurization of the contaminated water exiting the separation tanks 26.

The ninth port 76I connects the main valve 62 to the separation tank 26 flush ports, and the tenth port 76J connects the main valve 62 to the external fast flush water source 32 which provides pressurized flush water to the apparatus 10.

Referring to FIGS. 2, 4 and 13 to 18, the sequencing valve 64 controls the flow of raw and recirculated water between the main valve 62 and the water treatment means 22. The sequencing valve 64 is also an ec valve and is of similar configuration to the main process flow control valve 62. The sequencing valve 64 comprises a valve body 84 having a cylindrical bore 86 along its longitudinal axis and a plurality of ports, in this case six, 88A to 88G. Each port 88 comprises a channel through the valve body 84 defining an opening at the bore 86. The ports 88 are spaced axially of the cylindrical bore 86 and are arranged to cooperate with axially spaced annular recesses and openings 90 arranged on the piston 92. The piston 92 has a cylindrical outer surface arranged in a sliding fit within the bore 86 and includes a channel 96 along an interior thereof. The openings 90 are arranged axially along the piston for communicating water between the channel 94 and corresponding ports 88 in the valve body 84. The piston 92 is selectably positionable between six positions within the valve body 84.

The sequencing valve 64 includes a valve actuator 94 which is controlled by the control unit 72 and which selectably controls the movement of the piston 92 within the valve body 84 between the six positions thereby selectively communicating water between desired ports 88.

The ports 88 on the sequencing valve 64 are connected to the ducting 36 for communication of raw and recirculated water between the water treatment means 22 and the main valve 62 and are arranged as follows. The first port 88A is connected to the third port 76C of the main valve 62 for communication of raw and recirculated water therebetween. The second port 88B is connected to the fourth port 76D of the main piston valve 62 for communicating raw and recirculated water therebetween.

The third port 88C is connected to the first port 102 of the membrane separator housing 100 and the fourth port 88D is connected to the second port 103 of the membrane separator housing 100. The fifth, sixth, and seventh ports 88E, 88F, and 88G are connected to the first, second, and third flush ports 104A, 104B, and 104C respectively, for communication of raw and recirculated water between the sequencing valve 64 and the membrane separator housing 100.

Figure 19:
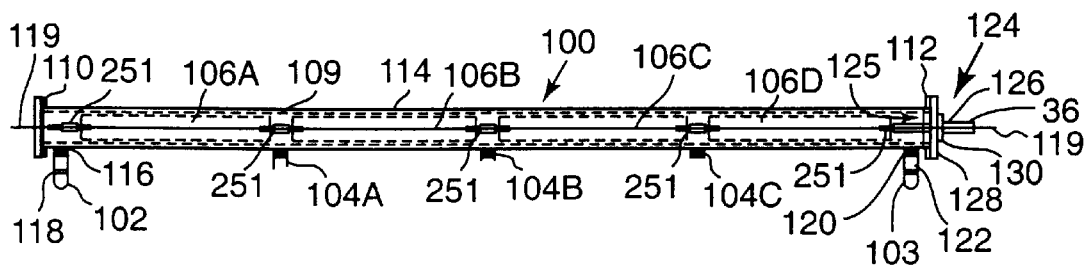
FIG. 19 is a side view of the membrane housing.

The water treatment means 22 in the simplest configuration comprises a membrane housing 100 and a single membrane separator arranged within the housing 100. A plurality of membrane housings 100 may be employed, each membrane housing 100 having a plurality of membrane separators 106 arranged in series. Referring to FIGS. 2, and 19 the four membrane housings 100A to 100D are shown arranged in parallel, each membrane housing having a four membrane separators 106A to 106D arrange in series therein.

Each membrane housing 100 comprises a hollow elongate member 108 which extends from a first end 110 to a second end 112 and includes an outer cylindrical wall 114. The hollow elongate member 108 is sized to receive the membrane separators 106 within. The first port 102 is arranged in the housing 100 adjacent the first end 110 of the elongate member 108. The first port 102 comprises an opening 116 through the outer cylindrical wall 114 of the elongate member 108 and a fitting 118 for coupling to the ducting 36 which connects the fitting 118 to third port 88C of the sequencing valve 62. The fitting 118 is arranged at the opening 116 at approximately 90° to a longitudinal axis 119 through the elongate member 108. Water entering or leaving through the first port 102 therefore does so substantially perpendicular to the direction of flow through the housing 100 thereby preventing a jetting of water against the end of the first membrane separator 106A, causing damage and premature wear to the membrane separator 106A.

The second port 103 is arranged adjacent the second end 112 of the elongate member 108 and comprises an opening 120 through the outer wall 114 of the elongate member 108 and the fitting 122 for coupling to the ducting 36. The opening 120 and fitting 122 are arranged similarly to the opening and fitting of the first port such that water entering or leaving through the second port 103 does so substantially perpendicular to the longitudinal axis 119 of the housing 100 thereby preventing a jetting of water against the end of the first membrane separator 106D, causing damage and premature wear to the membrane separator 106D.

The housing 100 also includes a product water outlet port 124 arranged at the second end 112 of the elongate member 108. The product water outlet port 124 comprises an opening 125 at the second end of the elongate member 108 and a fitting 126 connected to the ducting 36 for communication of the product water to the product water storage facility 30.

Raw and recirculated water may be directed by the sequencing valve 62 during forward or reverse operation to one or the other of the first or second ports 102 and 103. This water then passes through the membrane separators 106. The forward direction is the direction of flow from the first end 110 of the membrane housing 100 towards the second end 112 of the membrane 100. The reverse direction is the direction of flow opposite to the forward direction.

During forward operation raw and recirculated water is directed to the first port 102 in the membrane separator housing 100 and through the membrane separators 106 to the second port 103. Product water is separated by the membrane separators 106 from the raw and recirculated water and exits the membrane separator housing 100 through the product water output port 124. The portion of the raw and recirculated water which does not become product water now contains higher concentrations of contaminants as a result of having had the product water removed. The concentrated contaminated water exits the membrane housing 100 through the second port 103 and is directed by the sequencing valve 64 to the main valve 62 for recirculation.

When operating in the reverse direction raw and recirculated water enters through the second port 103 and passes through the housing 100 and membrane separators 106 to the first port 102. Product water drawn from the raw and recirculated water exits the housing 100 through the product water port 124 as it does when operating in the forward direction, however the concentrated contaminated water exits the housing 100 through the first port 102 instead of the second port 103 and is directed by the sequencing valve 64 to the main valve 62 for recirculation.

The membrane separator housing 100 includes an opening 127 at at least one of the first and second ends 110 and 112 thereof. The opening 127 is sized to receive the membrane separators 106 therethrough. This allows for periodic removal of the membrane separators 106 for maintenance or replacement. A removable and reengageable closure 128 is arranged at the opening 127. The closure 128 comprises a sealed plate fastened at the opening 127 at the end of the housing 100. The closure 128 includes the opening 125 arranged therethrough for receiving the fitting 126 of the product water output port 124.

Product water exiting the membrane separator housing 100 is communicated via the ducting 36 to the product accumulator tank 24 which collects and stores a predetermined volume of the product water. Product water collected in the product accumulator tank 24 is used for inversely flushing the membrane separators 106 and for providing a clean water supply for bathing the water treatment apparatus 10 during shutdown. Bathing the membrane separators 106 in clean water during shutdown reduces buildup of contaminates of the separator membrane and provides a quantity of clean water at start up. Having clean water available at start up removes the need for discarding the product water produced at start up to ensure that contaminated water does not enter the product water storage facility 32.

Figure 20:
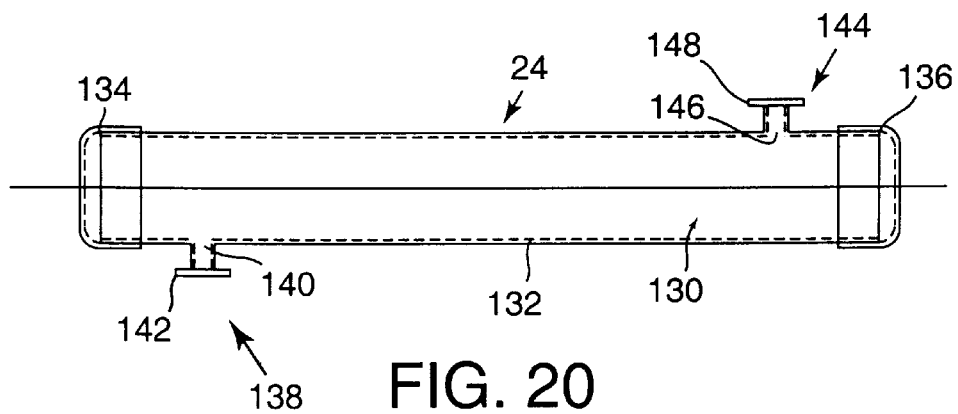
FIG. 20 is a side view of the accumulation tank.

Referring to FIGS. 2 and 20 the product accumulator tank 24 comprises an elongate vessel 130 having an outer cylindrical wall 132 and closed first and second ends 134 and 136. A first port 138 receives product water via the ducting 36 from the product water output port 124 on the membrane housings 100. The first port 138 comprises an opening 140 through the outer cylindrical wall 132 of the elongate vessel 130, and a fitting 142 arranged external to the vessel 130 at the opening 140. In the embodiment illustrated the first port 138 is arranged in a lower portion of the outer cylindrical wall 132 at 90 degrees to the longitudinal axis of the elongate vessel 130.

The accumulator tank 24 also includes an second port 144 which is connected to the ducting 36 for communicating treated water to the storage facility 30. The second port 144 comprises an opening 146 through the outer cylindrical wall 132 of the elongate vessel 130. A fitting 148 is arranged external to the vessel 130 at the opening 146 at 90 degrees to the longitudinal axis of the elongate vessel 130. In the embodiment illustrated the second port 144 is shown arranged on an upper portion of the elongate vessel 130 for communicating water external to the tank.

The inverse flow pump 25 is arranged between the product accumulator tank 24 and the water treatment means 22. The inverse flow pump 25 is arranged such that it receives product water from the product accumulator tank 28 and pumps it through the ducting 36 back to the product water outlet port 124 of the membrane housings 100. The inverse flow pump 25 pumps water at a pressure up to full operating pressure to the product water outlet port 124 and inversely through membrane separators 106. This is done to force water through the membranes in a direction opposite to normal flow, thereby cleaning the membrane separators 106 by removing particulate material built up on the membranes which can not be removed by merely flushing the membranes. This cleaning method removes the need for chemical cleaning of the membrane separators 106 and is an important improvement over conventional systems. The inverse flow pump 25 may be any appropriate means of producing the required pressure and may include pumps, pressure tanks, or a gravity feed.

Referring to FIGS. 2 and 21 to 23, concentrated contaminated water which exits the membrane housing 100 through the second port 103 during forward flow, and which exits the membrane housing 100 through the first port 102 during reverse flow is recirculated by the sequencing valve 64 and the main process flow control valve 62. During recirculation the concentrated contaminated water is directed by the main process flow control valve 62 to one or more separation tanks 26. In the illustrated embodiment two separation tanks 26 are shown.

The separation tanks 26 remove materials suspended in the concentrated contaminated water prior to recirculation of the water back to the water treatment means 22. This reduces the problem of materials precipitating out of the concentrated contaminated water in the membrane separators 106. Each separation tank 26 is selected to have a diameter size such that the pressure and velocity of pressurized concentrated contaminated water from the water treatment means 22 entering the tank 26 is reduced a predetermined amount sufficient to cause the materials suspended or dissolved in the water to separate out. These materials collect adjacent the top or the bottom of the tank 24 depending upon whether the materials are heavier or lighter than water. This is an important improvement over conventional systems in that it reduces the amount of dissolved and suspended material in the water so that it can be recirculated back to the membrane separators 106 without causing excessive wear, damage, and fouling of the membrane separators 106.

Figure 21:
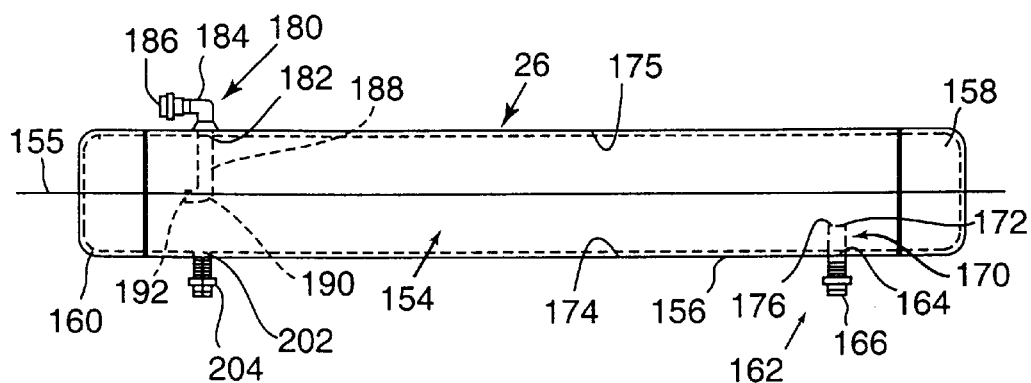
FIG. 21 is a side view of the separation tank.
Figure 22:
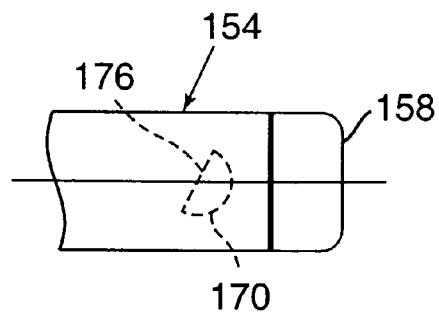
FIG. 22 is a top view of the separation tank.
Figure 23:
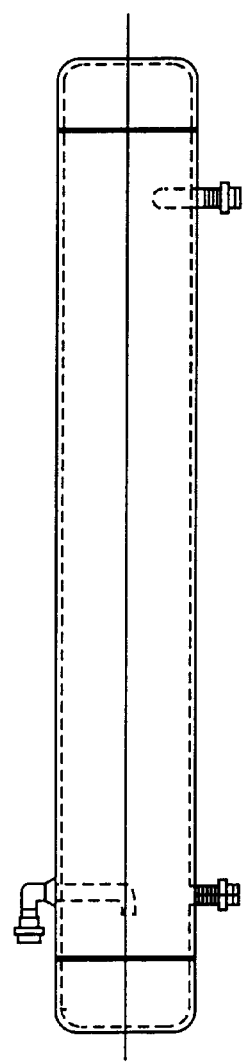
FIG. 23 is a side view of an alternative arrangement of the separation tank.
Figure 24:
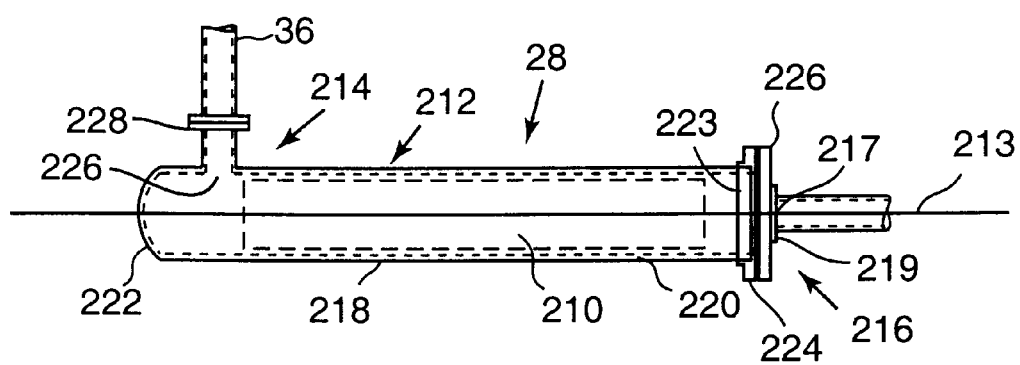
FIG. 24 is a side view of the recirculation pump and pump housing.
Figure 25:
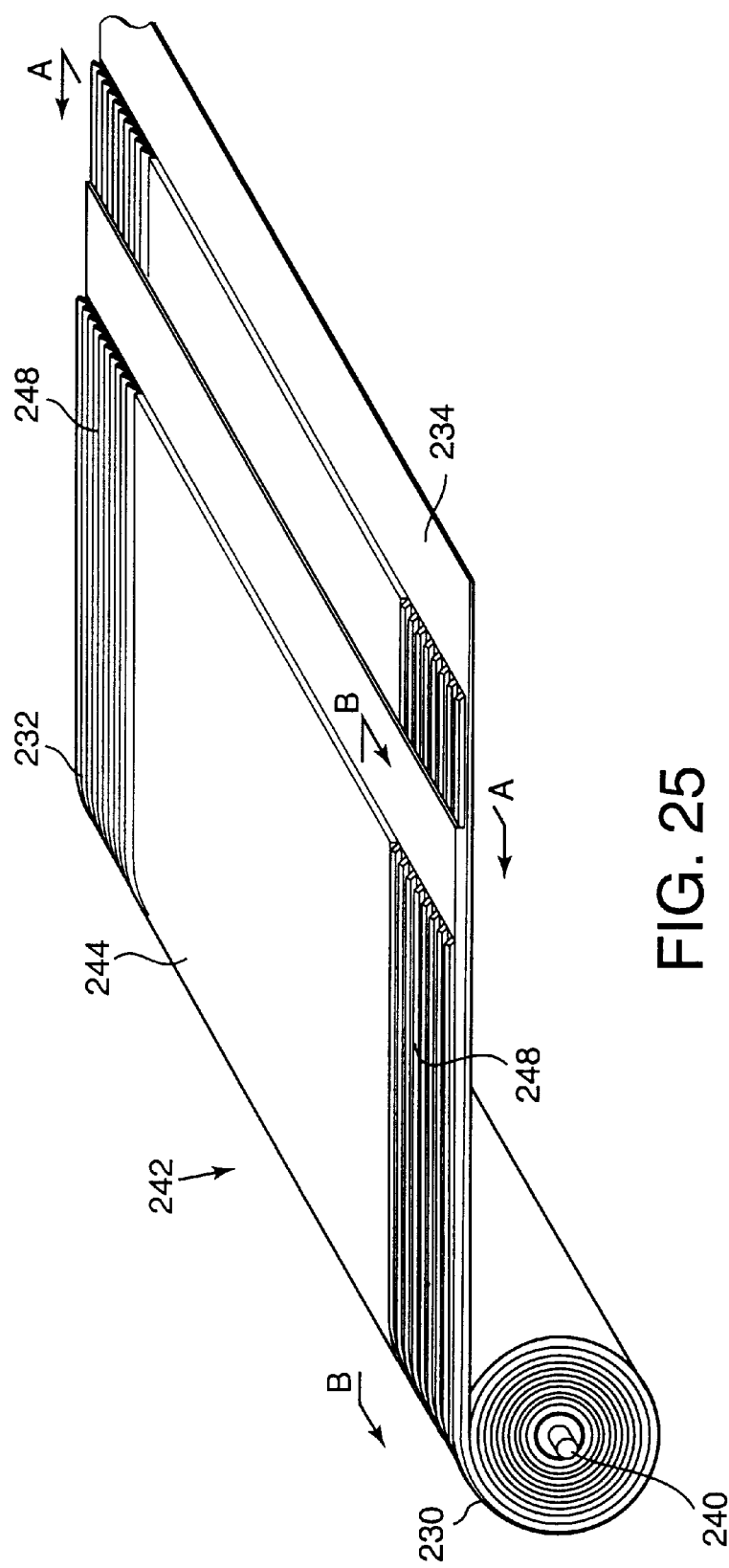
FIG. 25 is an isometric view of a membrane separator partially unrolled.
Figure 26:
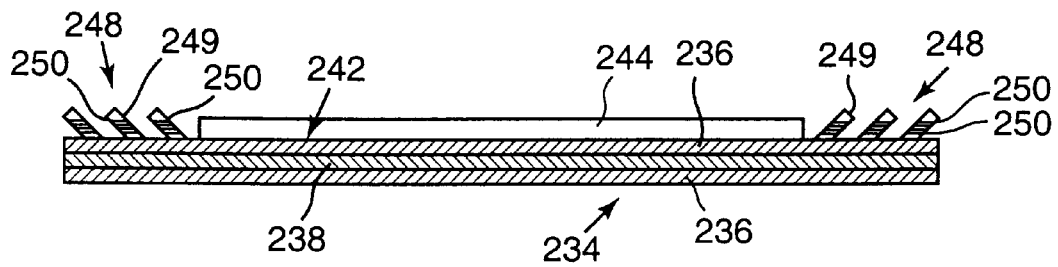
FIG. 26 is a cross section through A—A of FIG. 25.
Figure 27:
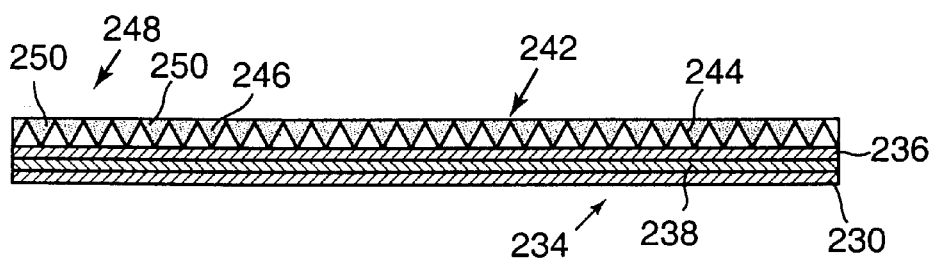
FIG. 27 is a cross section through B—B of FIG. 25.

Referring to FIGS. 21 to 23 each separation tank 26 comprises an elongate vessel 154 which is substantially circular in cross section, has an outer cylindrical wall 156, and closed first and second ends 158 and 160. An inlet port 162 is arranged adjacent the first end 158 of the separation tank 26. The inlet port 162 comprises an opening 164 through the outer cylindrical wall 156 and a fitting 166 arranged at the opening 164. The fitting 166 is connected to the ducting 36 for receiving concentrated contaminated water from the main process flow control valve 62. The fitting 166 includes an inlet 168 arranged external to the vessel 154 and a stem 170 extending into the elongate vessel 154. The stem 170 extends from the inlet 168 into the elongate vessel 154 to an end 172 spaced from a bottom portion of the interior wall 174 of the vessel 154.

The stem 172 includes an outlet 176 adjacent the end 172 arranged such that it is spaced from the bottom portion of the interior wall 174. The stem 170 is set at 90 degrees to the direction of flow of the tank 26 to force laminar flow through the body 154 of the tank 26. This enables solids and sludges to more easily leave the water stream. The outlet 176 is angled upwards and away from the bottom portion of the interior wall 174 and at an angle to a longitudinal axis 155 of the elongate vessel 154. The arrangement of the outlet 176 causes concentrated contaminated water entering the vessel 154 via the inlet port 160 to spiral along the interior surface of the outer wall 156 in a direction towards the second end 160 of the separation tank 26. The spiraling motion of the water causes centrifugal forces to be developed on materials suspended in the concentrated contaminated water thereby enhancing separation of the materials from the water.

An outlet port 180 is arranged in the elongate vessel 154 adjacent the second end 160 thereof. The outlet port 180 comprises an opening 182 through the outer cylindrical wall 156 of the elongate vessel 154 and a fitting 184 arranged at the opening 182. The fitting 184 is connected to the ducting 36 for communication of water to the main process flow control valve 62. The fitting 184 comprises the outlet 186 arranged external to the vessel and a stem 188 extending from an end arranged adjacent the opening 182 to end 190 arranged interior to the elongate vessel 154 and spaced from a top portion of the interior wall 175. The stem 188 of the outlet port 180 is substantially L shaped with the inlet 192 at the foot of the L. An inlet 192 is arranged adjacent the end 190 of the stem 188 at a location spaced from the bottom portion of the interior wall 174. The stem 188 is set at 90 degrees to the flow of water through the tank 26. The inlet 192 may be baffled or placed to face in an opposite direction to the flow of water in the tank 26 to prevent channeling through the body of the tank 26, and thus to prevent accumulated and separated solids and sludges from exiting the tank 26. The inlet 192 is also arranged adjacent the longitudinal centre line 155 angled upwards and away from the centre line 155.

Each separation tank 26 also includes a flush port 200 set at the lowest point of the tank 26, but opposite to the inlet port 162, so that accumulated solids and sludges may easily be expulsed or purged from the tank 26 by either a forced water flow or gravity drain. This may be done on a periodic basis determined by the loading of the tank 26 as solids are accumulated. In an alternative arrangement the inlet and outlet ports 162 and 180 may be utilized to accomplish purging.

The flush port 200 comprises an opening 202 through the outer cylindrical wall 156 and a fitting 204 arranged at the opening 202. The fitting 204 of the flush port 200 is connected to the ducting 36 and communicates contaminated water and separated material through the ducting 36 to the main process flow control valve 62 for discharge through the waste water discharge 34.

Referring to FIG. 20 the separation tanks 26 may be arranged either for removing precipitate and materials which are heavier than water, or for removing materials which are lighter than water such as oils and flotsam in the water.

The separation tank 26 arranged to remove precipitates and materials which are suspended in the water but are heavier than water is arranged substantially horizontally with the inlet port 162 arranged adjacent the bottom portion of the interior wall 174 of the elongate vessel 154 and with the end 172 of the stem 170 of the fitting 162 spaced upwardly from the bottom portion of the interior wall 174 of the vessel 154. The outlet port 180 is arranged in a top portion of the interior wall 175 with the end 190 of the stem 188 spaced downwards from a top portion of the interior wall 175 of the elongate vessel 154. In this arrangement the flush port 200 is arranged in the outer cylindrical wall 156 adjacent the bottom 174 of the elongate vessel 154.

Referring to FIG. 23 the separation tank 26 arranged to remove lighter than water materials such as oils and suspended materials floating in the water is preferably oriented substantially vertically. In this arrangement the inlet port 162 is arranged adjacent the top of the elongate vessel 154 and the outlet port 180 is arranged adjacent the bottom 158 of the elongate vessel. The inlet 192 of the outlet port 180 is angled such that it draws water from adjacent the bottom of the tank 26. The flush port 200 is arranged in the outer cylindrical wall 156 adjacent the top of the elongate vessel 154.

Referring to FIGS. 2 and 23 the recirculation pump set 28 is arranged to receive concentrated contaminated water from the water treatment means 22 via the sequencing and main valves 64 and 62, and the separation tanks 26. The recirculation pumps 28 repressurize the concentrated contaminated water back to full operating pressure and return it to the membrane separators 22 through the main valve 62 and the sequencing valve 64.

Each recirculation pump 28 comprises a water cooled submersible pump 210 arranged within a pump housing 212. The pump housing 212 comprises a hollow elongate vessel 218 having an inlet port 214, outlet port 216, an outer cylindrical wall 220, a closed first end 222, and an opening 223 at the second end 224. The inlet port 214 receives contaminated recirculation water from the main valve 62 and the outlet port 216 communicates repressurized water back to the main valve 62 for recirculation to the water treatment means 22.

The inlet port 214 is arranged adjacent the closed first end 222 and comprises an opening 206 through the outer cylindrical wall 220, and a fitting 214 arranged at the opening 206. The fitting 214 is connected to the ducting 36 and communicates water to the pump housing 212. The fitting 214 and opening 206 are arranged such that water entering the housing 212 does so at approximately 90° to the longitudinal axis 213 of the housing 212 and flows through the housing 212 to the pump 210

The second end 224 of the housing 212 includes the opening 223 and removable and reengageable closure means 226 for closing the opening 223. The opening 223 is sized to receive the pump 210 therethrough, thereby allowing for periodic removal of the pump 210 for replacement and maintenance. The closure means 226 comprises a sealed bolt plate sized to extend across the opening 223.

The outlet port 216 comprises an opening 217 through the closure means 226 and a fitting 219 connected to the ducting 36. The outlet port 216 communicates pressurized water exiting the pump housing 212 to the valve arrangement 20 via the ducting 36.

One or more pumps make up the recirculation pump set 28. These pumps are arranged in parallel to provide the necessary volumetric flow and to boost the pressure of water leaving the membrane separators 106 back up to operating pressure. The recirculation pumps 28 are also arranged in parallel with the main drive pump 18 which results in greater energy efficiency for the system.

The recirculation pumps 28 are selected to operate near the high end of their operating range such that they generate excess heat. This excess heat is transferred to the water flowing through and around the pump thereby raising the water temperature within the water treatment apparatus. This improves the efficiency of the separation membranes 106. To help maintain the water at a higher temperature the ducts 36 and recirculation pump housings 218 are made of materials having good insulating properties or are insulated to reduce heat loss.

Referring to FIGS. 2, 18 and 25 to 29, each membrane separator 106 extends from a first end 230 to a second end 232, and comprises a water separation membrane 234, and a product water carrier duct 240. The separation membrane 234 comprises a pair of spaced apart water permeable thin-film membrane layers 236 and a water conducting layer 238 arranged between the water permeable layers 236. Each water permeable membrane layer 236 has a characteristic which allows pressurized water to pass through the membrane layer 236 but prevents contaminants from passing through the membrane layer 236. Water passing through the membrane layers 236 is conducted along the water conducting layer 238. The product water carrier duct 240 extends through the membrane separator 106 and is attached to the separation membrane 234 such that the water conducting layer 238 can communicate water to the duct 240.

A pressure resistant outer casing 241 such as fiberglass tape or a tube extends around the outer most circumference and along the length of the membrane separator 106.

A spacer 242 is arranged adjacent the separation membrane 234 such that the separation membrane 234 and spacer are arranged in a rolled configuration with the duct 240 at the center of the roll. The roll is elongate and is arranged in a spiral configuration in cross section such that the spacer 242 is interposed between adjacent surfaces of the water separation membrane 234. Thus adjacent portions of the membrane 234 are spaced from each other by the spacer 242.

The spacer 242 comprises a sheet of material having a plurality of feed spacer channels 244 arranged in side to side arrangement and running parallel to one another. The plurality of feed spacer channels 244 are connected together at the ends 230 and 232 of the spacer 242. Each feed spacer channel 244 extends longitudinally along the membrane separator 106 from the first end 230 to the second end 232, and is V, diamond, circular, or oblong shaped. The feed spacer channels conduct water along the length of the separation membrane 234 allowing the water to come into contact with the water permeable layer 236. At each of the first and second ends 230 and 232 are filtration means 248 which extend between adjacent layers of the separation membrane 234 within the roll. The filtration means 248 comprise a plurality of members 249 joined together at the ends and running along the sheet perpendicular to the direction of the feed spacer channels 244. Each filtration means member 249 extends upwards from the membrane 234, and has a plurality of perforations 250 extending therethrough. The members 249 may comprise flat, angled, V, diamond, circular, or oblong shaped spacer material that is porous or incorporates channels in opposing directions and which is arranged perpendicular to the feed spacer channels 244. The perforations 250 allow contaminated water to pass through but trap particulate matter external to the membrane separator 106 preventing the particles from entering the water conducting feed spacer channels 244 and coating the water permeable layers 236 of the membrane 234. This arrangement reduces the amount of particulate matter collecting in the channels 244 on the water separation membrane 234 and thereby reduces the number of forward reverse and inverse flush cycles required to clean the channels 244 and the membranes 234.

The membrane separators 106 are arranged such that water entering the membrane housing 100 is directed to one of the first or second ends 230 or 232 of the membrane separator 106. This water then passes through the filtration means 248 and along the water conducting channels 244 of the membrane spacer 242. As the contaminated pressurized water flows along the channels 244 some of it passes through the water permeable layers 236 of the separation membrane 234 and enters the water conducting layer 238 which then communicates it through the spiraled roll to the duct 240. This removes a portion of the water from the contaminated water. Contaminated water not passing through the separation membrane 234 continues along the feed spacer channels 244 and passes out the filtration means 248 at the end opposite (230 or 232) exiting the membrane separator 106. If there are a number of membrane separators 106 arranged in series the contaminated water, which is now concentrated, having had some of the water removed from it, enters the next membrane separator 106 in series and the process is repeated until the water exits the housing 100 outlet as concentrated contaminate water either to be discharged through the waste water discharge 34 or to be recirculated.

Membrane separator connectors 251, shown in FIG. 18, connect the ducts 240 at the ends of adjacent membrane separators 106 and communicate the product water from one separator to the other to the product water output port 124. This water then flows to the product accumulator 24 and product water storage facility 30.

The separation membranes 234 may be cleaned by the inverse flush procedure. During the inverse flush clean treated water from the product accumulator 24 is repressurized to pressures from as low as 1 psi to as high as full operating pressure by the inverse flow pump 25 and is directed through the product water output port 124 to the membrane separators via the ducts 240. Clean water then passes through the ducts 240, the water conducting layer 238, and through the thin-film material making up the water permeable layers 236. The water then flows out of the membrane separator 106 through the feed spacer channels 244. The inversely flowing water then travels through the filtration means 248 at the ends of the membrane separators 106 removing material trapped by the filter means 248. The inverse flow flush removes particulate matter which may have collected on and coated the surface of the separation membranes 234 and in the feed spacer channels 244. Water leaving the membrane separators 106 exits the housing 100 through the first and second ports 102 and 103 and through the flush ports 104 and is directed to the separation tanks 26, or directly to waste water discharge 34.

Figure 28:
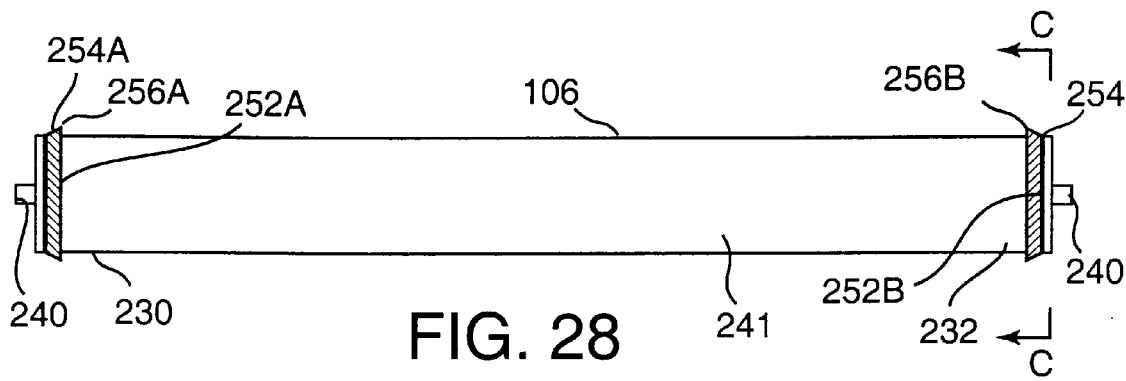
FIG. 28 is a side view of a membrane separator.
Figure 29:
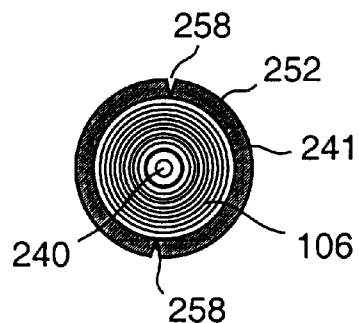
FIG. 29 is a cross sectional view through C—C of FIG. 28.

Referring to FIGS. 28 and 29, seals 252 are arranged between the membrane separators 106 and the interior wall 114 of the housing 100. This prevents water entering the housing 100 through one of the first or second ports 102 or 103 from merely passing around the membrane separators 106 and exiting the housing 100 through the other one of the ports 102 and 103. The seals 252 are brine seals and are arranged one at each end of the membrane separator 106.

The use of brine seals is known in conventional membrane separators. Brine seals are a "U"-cup design and allow water to pass in one direction but prevent it from passing in the other direction. The brine seals in conventional systems are generally placed one at each end of the membrane separator and are arranged to prevent water from flowing over and across the membrane separator thereby forcing water to enter the membrane separator end. This results in an area of lower pressure around the outside of the membrane separator down stream of the brine seal where the high pressure water can not flow and an area of higher pressure within the membrane separator. During high pressure operation or inverse flow flushing this pressure differential can lead to catastrophic failure of the membrane separator.

In the present invention brine seals 252 are used, however the brine seals 252 are positioned on the membrane separator 106 in a novel arrangement. A brine seal 252A is arranged at the first end 230 of the membrane separator 106 such that a first end 254A of the brine seal 252A is in contact with the membrane separator 106 adjacent the first end 230 of the membrane separator 106, and extends in from the first end 230 of the membrane separator 106 along the length of the membrane separator 106 and upwards toward the inner surface 109 of the membrane housing 100 to a second end 256A. This allows water directed at the first end 230 of the membrane separator 106 to pass the brine seal 252A, and along the length of the membrane separator 106. The second brine seal 252B is placed at the second end 232 of the membrane separator 106 in a similar manner to the first brine seal 252A. The second brine seal 252B is arranged with its first end 254B adjacent the second end 232 of the membrane separator 106 and extends in from the second end 232 of the membrane separator 106 upwards and along the membrane separator 106 to the second end 256B. The second end 256B lies in contact with the inner surface 109 of the housing 100. The second seal 252B prevents water which has passed over the first seal 252A from passing beyond the second end 232 of the membrane separator 106. By arranging the seals 252A and 252B in this manner pressurized water that is directed at the first end 230 of the membrane separator 106 can pass over and around the membrane separator 106 but cannot pass the second end 232 of the membrane separator 106. This traps pressurized water around the outside of the membrane separator 106 as well as directs pressurized water into the first end 230. Likewise if water is directed to the second end 232 of the membrane separator it passes over the second seal 252B and is prevented from passing the first end 230 of the membrane separator 106 by the first seal 252A. By doing this water of approximately the same pressure is present both inside and outside the membrane separator 106 thereby preventing the conditions which can cause the membrane separator 106 to fail in the manner described above.

Referring to FIG. 29 each brine seal 252 has a notch 258 in at least one, but preferably two, location(s) so that when flow and pressure are stopped, water pressure trapped between the brine seals 252 may be relieved to prevent inward rupturing of the membrane separator 106.

Referring to FIGS. 6 to 12, and 30 to 34 in operation the main control valve 62 controls the following functions: forward service flow, reverse service flow, forward fast flush flow, reverse fast flush flow, system shutdown, clean in place, and inverse flow.

Figure 30:
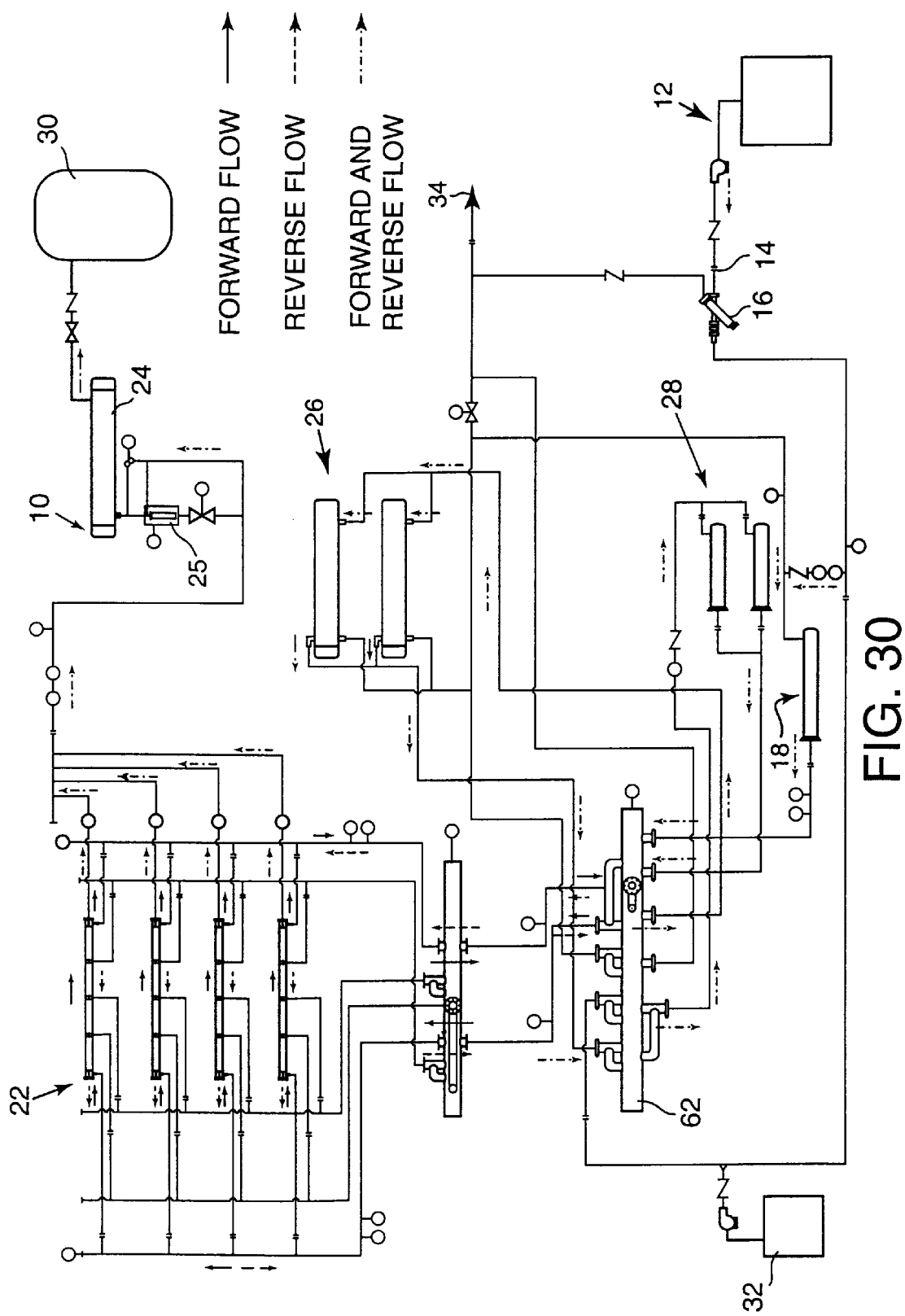
FIG. 30 is a schematic of the water treatment apparatus showing flow directions during Forward and Reverse operation.

Referring to FIGS. 6 and 30, forward service flow is selected by actuating the main valve 62 such that the valve member 68 is moved into the first position. In the first position raw contaminated water from the main drive pump 18 enters the first port 76A and contaminated water from the recirculation pump set 28 enters the second port 76B. These waters are merged and directed to the third port 76C. The water exits through the third port 76C and is communicated via the ducting 36 to the first port 88A of the sequencing valve 64 and through the water treatment means 22 in a forward direction. Product water is separated from the contaminated waters entering the water treatment means 22 and is directed to the product water storage facility 30. Concentrated contaminated water from the water treatment means 22 is directed to the sequencing valve 64, passes through the second port 88B of the sequencing valve 64 and on to the main valve 62. This water is received at the fourth port 76D of the main valve 62 and is directed through the sixth port 76F to the separation tanks 26 where some of the suspended and dissolved materials are removed. The contaminated water exits the separation tanks 26 and returns to the main valve 62 at the seventh port 76G. Finally this water is directed through the eighth port 76H to the recirculation pump set 28 where it is repressurized and returned to the main valve 62.

Referring to FIGS. 7 and 30, reverse service flow is selected by actuating the main valve 62 such that the valve member 68 is moved into the second position. In the second position raw contaminated water from the main drive pump 18 enters the first port 76A and contaminated water from the recirculation pump set 28 enters the second port 76B. These waters are then merged and directed to the fourth port 76D. The water exiting through the fourth port 76D is communicated via the ducting 36 to the second port 88B of the sequencing valve 64 and is directed through the water treatment means 22 in a reverse direction. Product water is separated from the contaminated waters entering the water treatment means 22 and is directed to the product water storage facility 30. Concentrated contaminated water from the water treatment means 22 is directed to the sequencing valve 64 passing through the first port 88A and on to the main valve 62. This water is received at the third port 76C of the main valve 62 and is directed through the sixth port 76F to the separation tanks 26 where some of the suspended and dissolved materials are removed. The contaminated water exits the separation tanks 26 and returns to the main valve 62 at the seventh port 76G. Finally this water is directed through the eighth port 76H to the recirculation pump set 28 where it is repressurized and returned to the main valve 62.

Referring to FIG. 8 the water treatment apparatus 10 may be shut down by moving the valve member 68 into the third position. In the third position all the main valve ports are closed and no water flows through the main valve 62.

Figure 9:
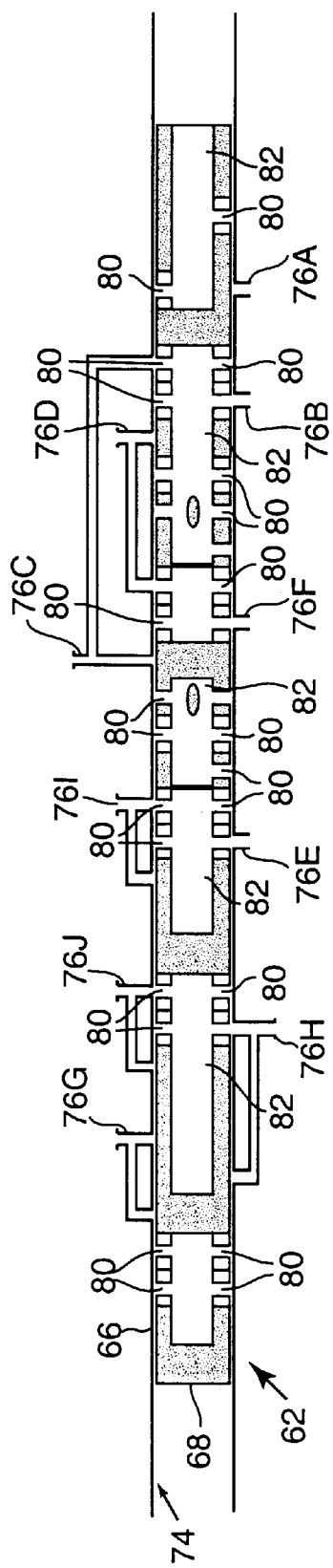
FIG. 9 is a schematic of the main valve showing the main valve in the fourth position.
Figure 31:
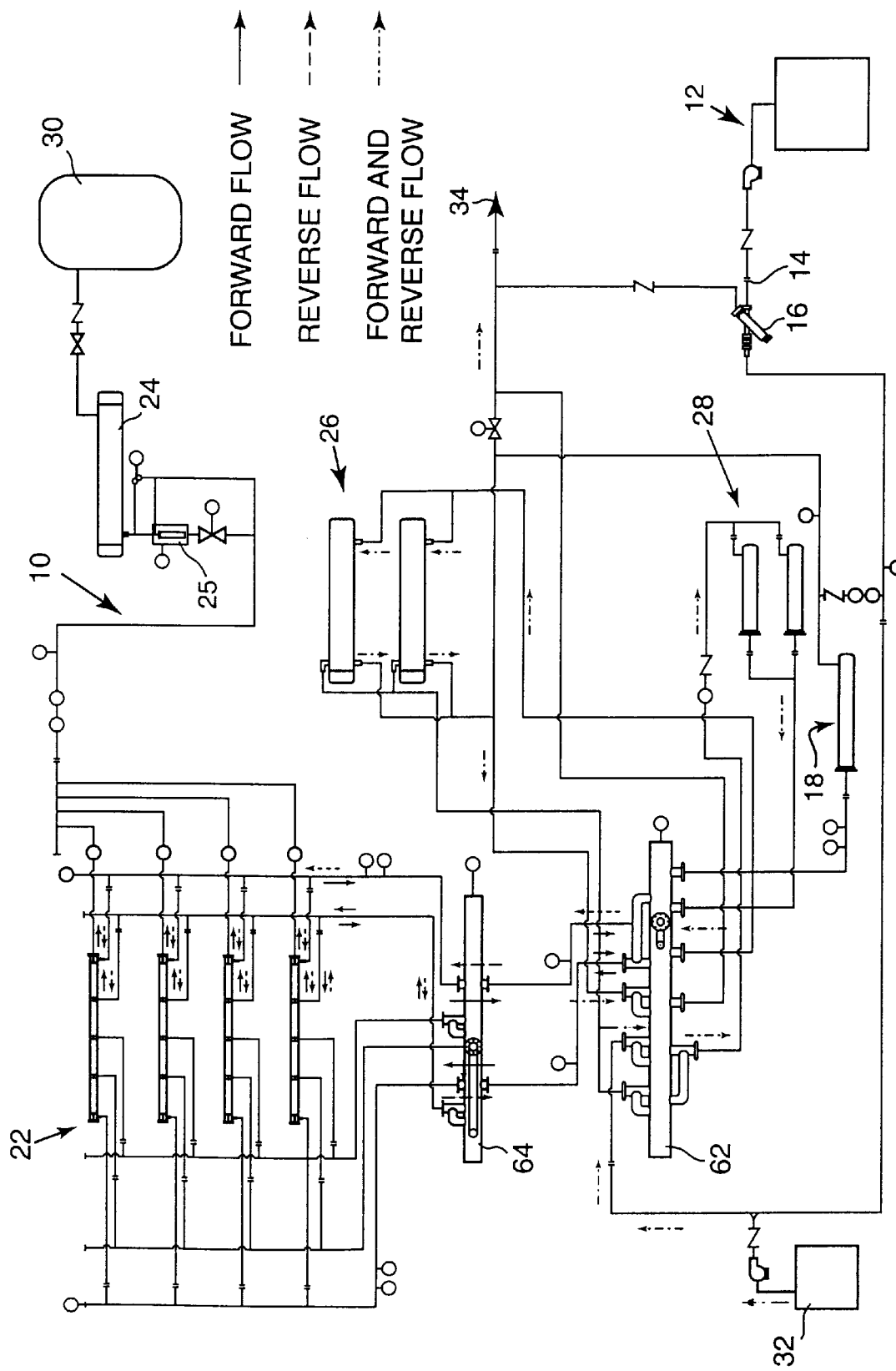
FIG. 31 is a schematic of the water treatment apparatus showing flow directions during a Forward and Reverse Fast Flush for the fourth membrane.
Figure 32:
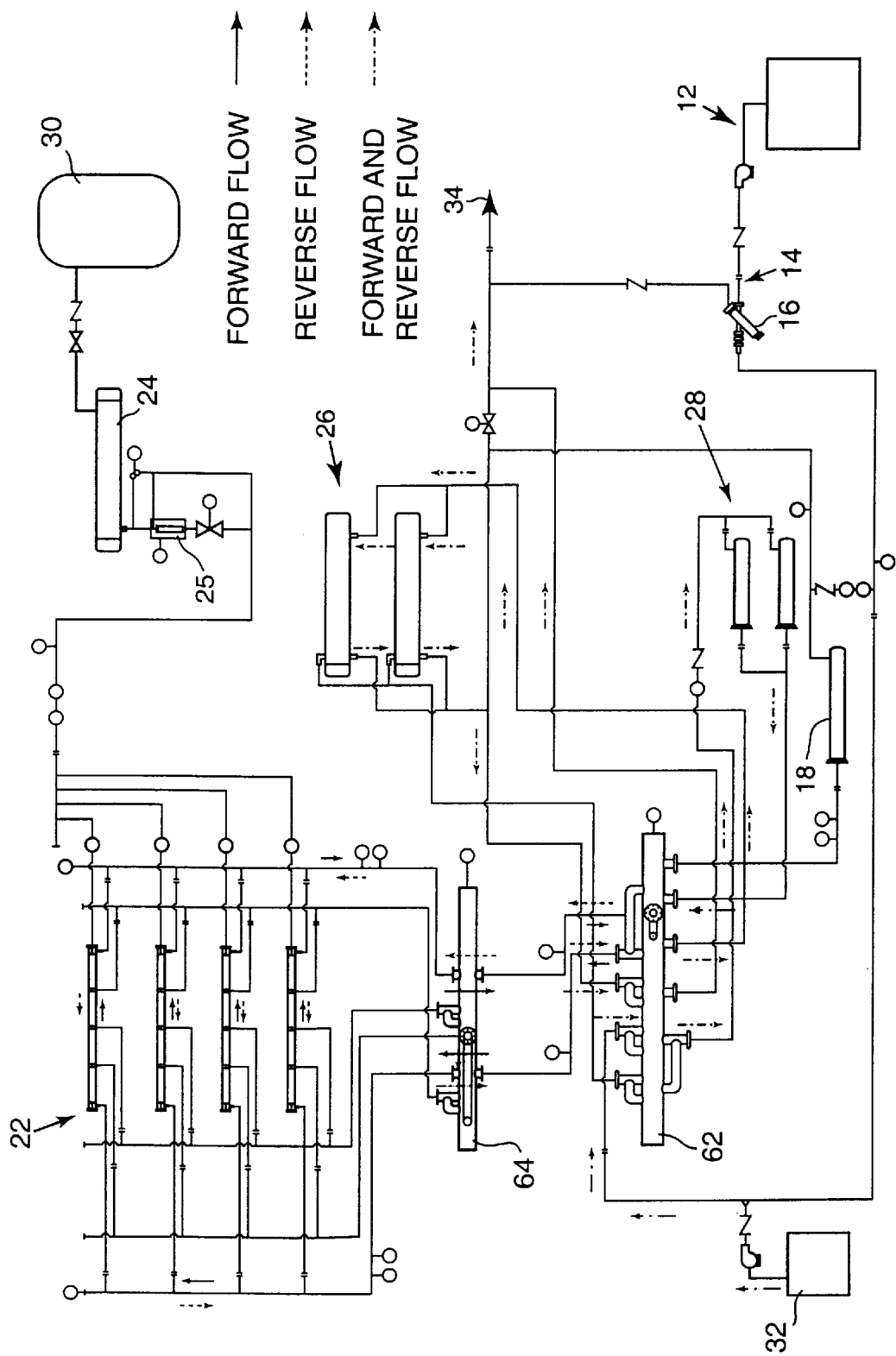
FIG. 32 is a schematic of the water treatment apparatus showing flow directions during a Forward and Reverse Fast Flush for the all membranes.

Referring to FIGS. 9 and 31 and 32, fast forward flushing is selected by actuating the main valve 62 such that the valve member 68 is moved into the fourth position. In the fourth position flush water from the external flush water source 32 enters the tenth port 76J of the main valve 62 and is directed to the eighth port 76H. The water exiting through the eighth port 76H is communicated through the recirculation pump set 28 to the second port 76B of the main valve 62. The water then exits the main valve 62 through the third port 76C and is directed to the first port 88A of the sequencing valve 64 and through the water treatment means 22 in a forward direction. Product water is not separated during this operation. Instead all of the flush water is directed from the water treatment means 22 back through the sequencing valve 64, passing through the second port 88B and on to the main valve 62. The water is received at the fourth port 76D of the main valve 62 and is directed through the sixth port 76F to the separation tanks 26. The water flushes each separation tank 26 exiting through the flush port 200 and returns to the main valve 62 at the ninth port 76I. Finally this water is directed to the waste water discharge through the fifth port 76E.

Figure 10:
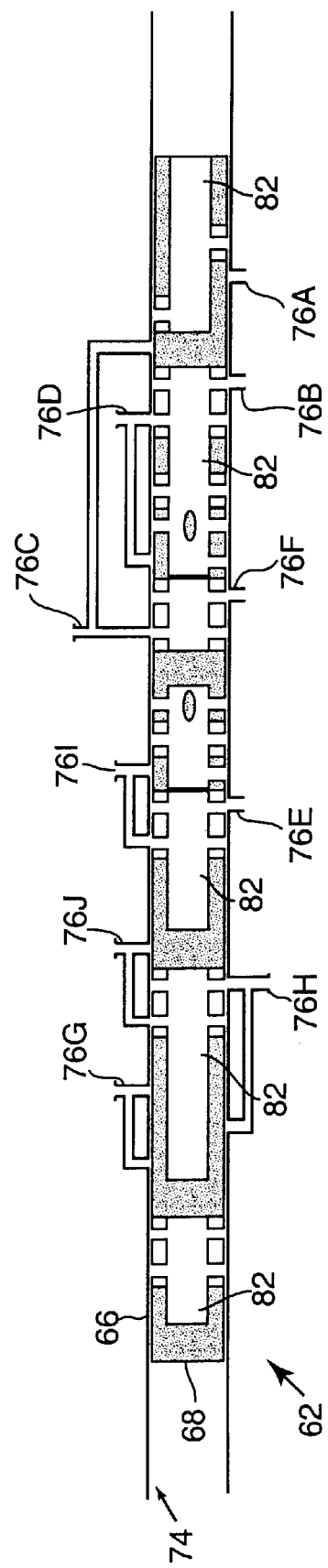
FIG. 10 is a schematic of the main valve showing the main valve in the fifth position.

Referring to FIGS. 10, 31 and 32, fast reverse flushing is selected by actuating the main valve 62 such that the valve member 68 is moved into the fifth position. In the fifth position flush water from the external flush water source 32 enters the tenth port 76J of the main valve 62 and is directed to the eighth port 76H. The water exiting through the eighth port 76H is communicated through the recirculation pump set 28 to the second port 76B of the main valve 62. The water then exits the main valve 62 through the fourth port 76D and is directed to the second port 88B of the sequencing valve 64 and through the water treatment means 22 in a reverse direction. Product water is not separated during this operation. Instead all of the flush water is directed from the water treatment means back through the sequencing valve 64, passing through the first port 88A and on to the main valve 62. The water is received at the third port 76C of the main valve 62 and is directed through the sixth port 76F to the separation tanks 26. The water flushes each separation tank 26 exiting through the flush port 200 and returns to the main valve 62 at the ninth port 76I. Finally this water is directed to the waste water discharge through the fifth port 76E.

Figure 11:
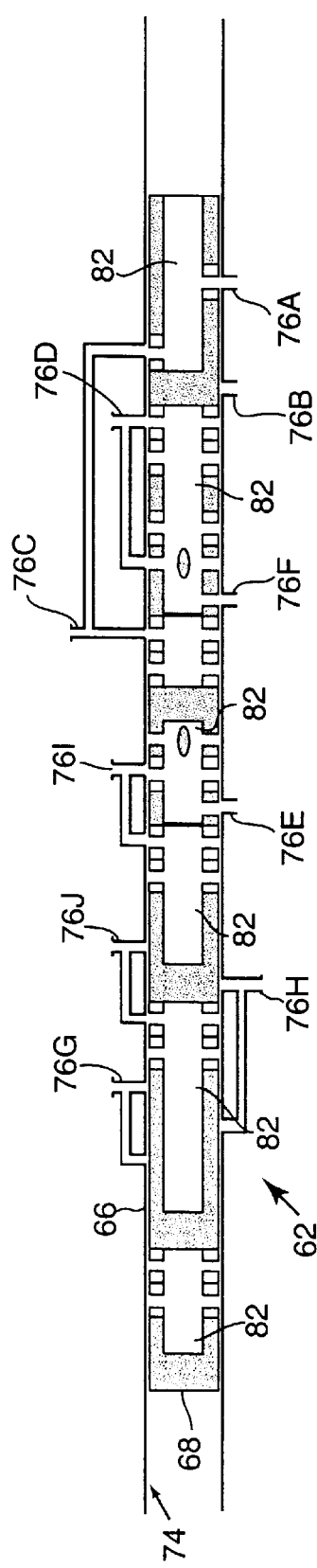
FIG. 11 is a schematic of the main valve showing the main valve in the sixth position.
Figure 33:
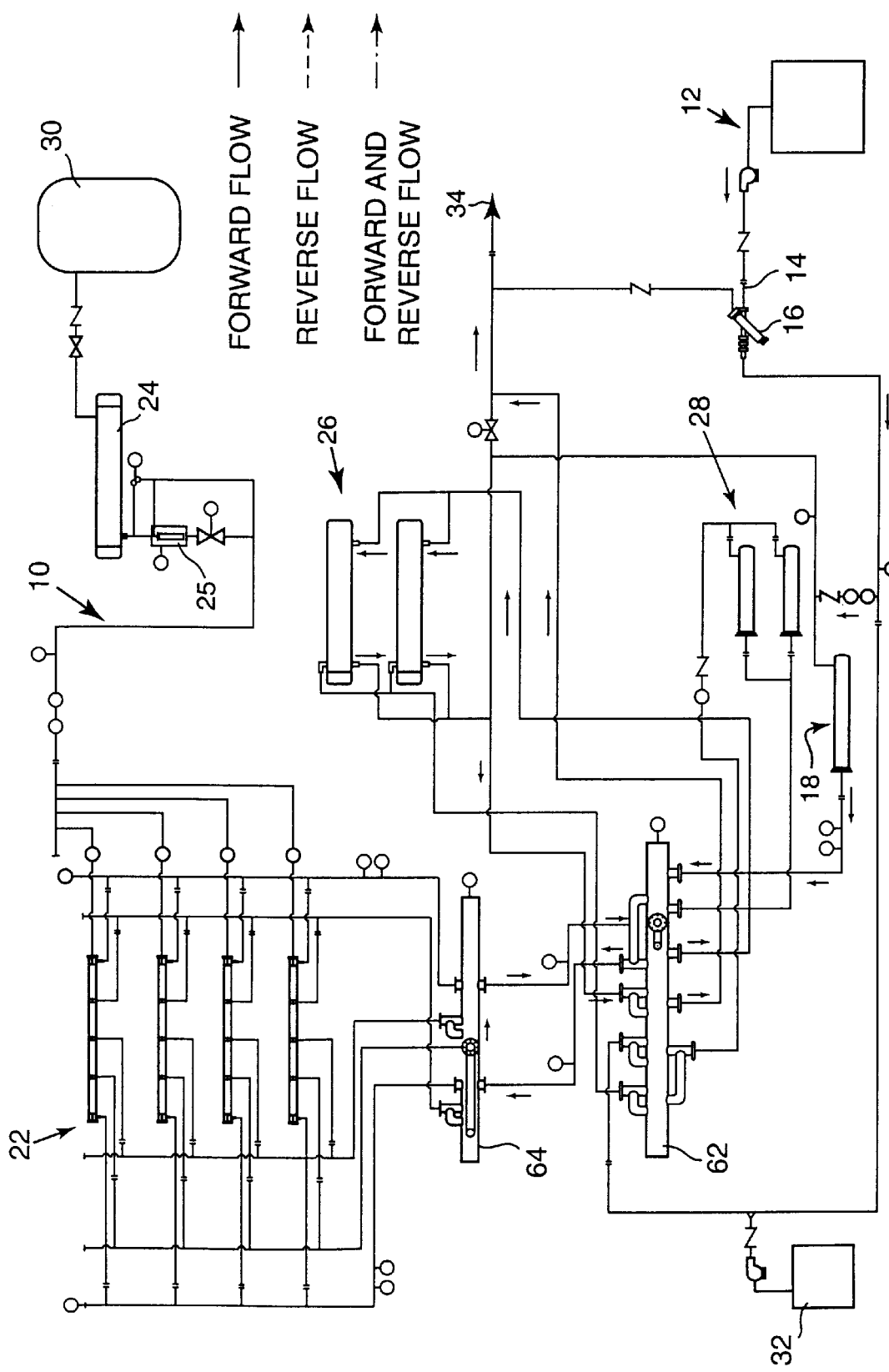
FIG. 33 is a schematic of the water treatment apparatus showing flow directions during a Clean in Place operation.

Referring to FIGS. 11 and 33 the valve member 68 when positioned in the sixth position operates the water treatment apparatus 10 through a clean in place operation. The clean in place operation is selected by actuating the main valve 62 such that the valve member 68 is moved into the sixth position. In the sixth position water from the separation tanks 26 containing high concentrations of contaminants and suspended materials which have been removed from the process water is drained from each separation tank 26 exiting through the flush port 200. This water returns to the main valve 62 at the ninth port 76I, and is directed to the waste water discharge through the fifth port 76E. The main drive pump 18 and the recirculation pump set 28 may be utilized to assist in the draining of the separation tanks 26.

Figure 12:
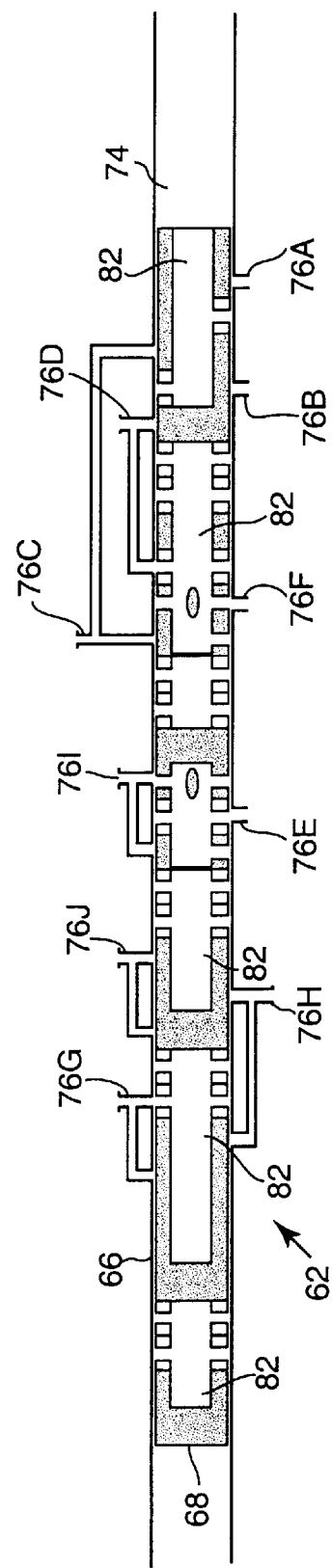
FIG. 12 is a schematic of the main valve showing the main valve in the seventh position.
Figure 34:
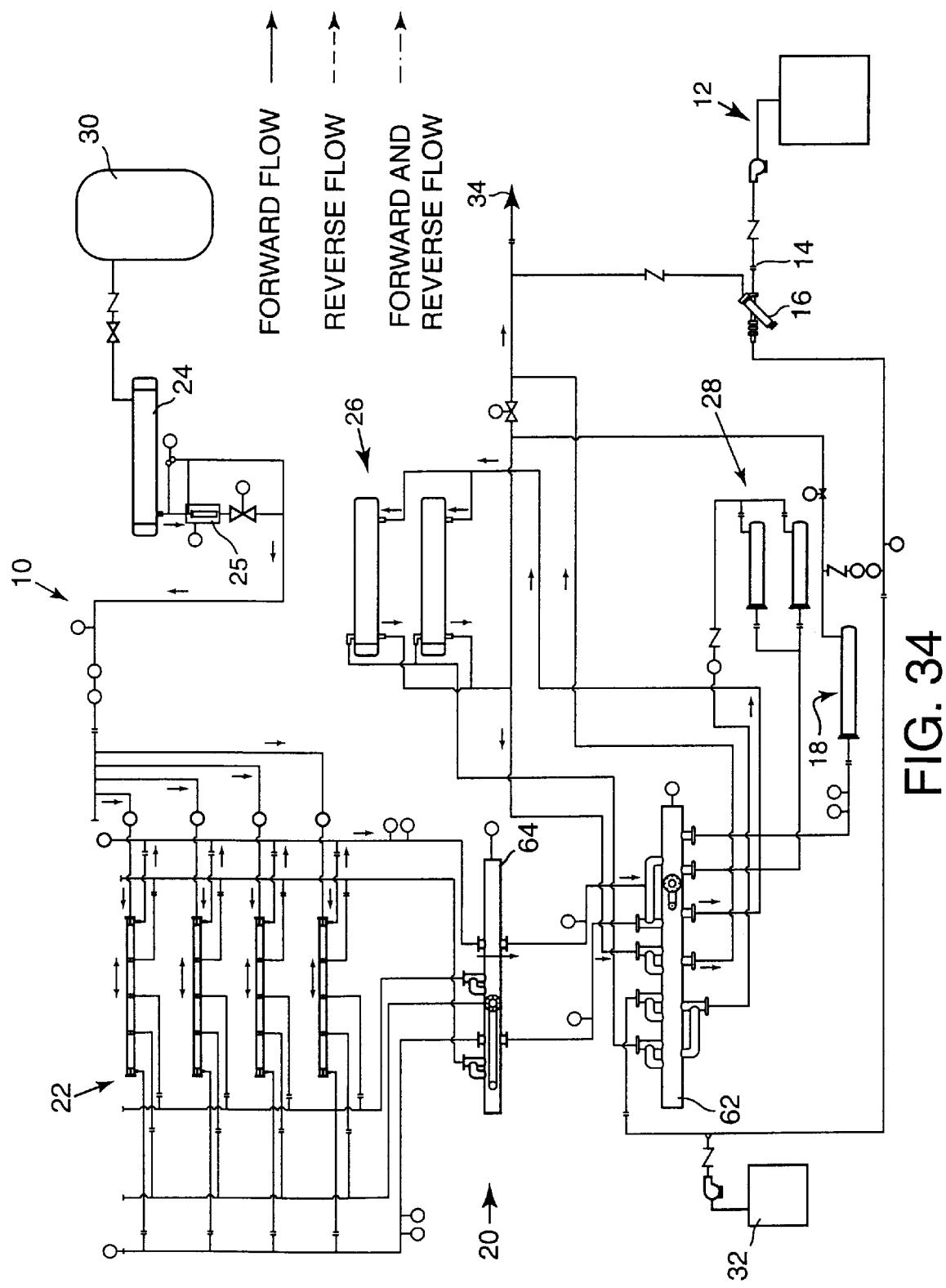
FIG. 34 is a schematic of the water treatment apparatus showing flow directions during an Inverse Flow operation.
Figure 35:
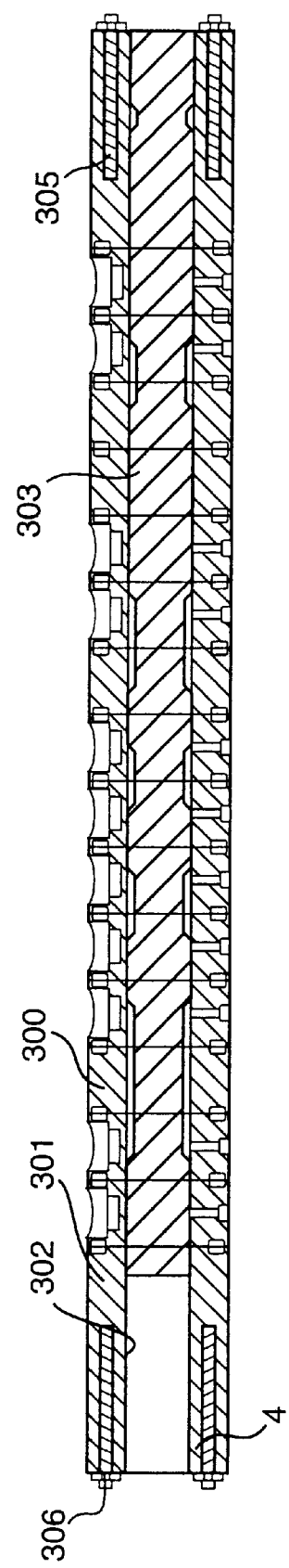
FIG. 35 is a longitudinal cross-section through a valve of the general type shown in FIGS. 6 to 18.

Referring to FIGS. 12 and 34, the inverse flush operation is selected by actuating the main valve 62 such that the valve member 68 is moved into the seventh position. In the seventh position clean water from the product water accumulator 24 is pressurized by the inverse pump 25 and is directed inversely through the water treatment means 22. The clean water is directed from the water treatment means 22 through the sequencing valve 64, exiting the second port 88B, to the main valve 62. The water is received at the fourth port 76D of the main valve 62 and is directed through the sixth port 76F to the separation tanks 26. The water flushes each separation tank 26 exiting through the flush port 200 and returns to the main valve 62 at the ninth port 76I. Finally this water is directed to the waste water discharge through the fifth port 76E.

The sequencing valve 64 is arranged to direct water across the membrane separators 106 in the housings 100. Water can be directed in either the forward or reverse direction across all of the membrane separators 106 or across individual membrane separators 106.

The forward and reverse flow of the water is controlled by the main piston valve 62 and the flow of water to the housings 100 is controlled by the sequencing valve 64. When the water treatment apparatus 10 is operated in the forward direction the sequencing valve 64 receives water at the first port 88A from the third port 76C of the main piston valve 62 and returns water from its second port 88B to the fourth port 68D of the main piston valve 62. When the water treatment apparatus 10 is operated in a reverse direction the sequencing valve 64 receives water from the fourth port 76D of the main piston valve at its second port 88B and delivers water to the third port 76C of the main piston valve from its first port 88A.

Referring to FIGS. 4, and 13 to 18, the sequencing valve 64 is controlled by the control unit 72 and the actuating means 94. The actuating means 94 selectably moves the valve member 92 within the valve body 91 between six positions. In operation the sequencing valve 64 performs the following functions: forward and reverse operation which directs flow between the first port 102 of the housing 100 and the second port 103 of the housing 100, forward and reverse flush of the first membrane separator 106A which directs flow between the first port 102 and the flush port 104A, forward and reverse flush of the second membrane separator 106B which directs flow between the flush port 104A and the flush port 104B, forward and reverse flush of the third membrane separator 106C which directs flow between the flush port 104B and the flush port 104C, forward and reverse flush of the fourth membrane separator 106D which directs flow between the flush port 104C and the second port 103.

Figure 13:
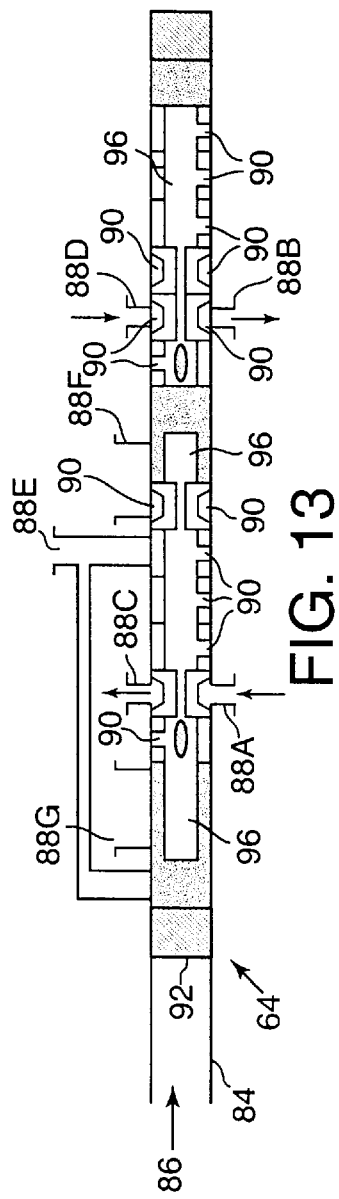
FIG. 13 is a schematic of the sequencing valve showing the sequencing in valve in the first position.

Referring to FIGS. 13 and 31 forward and reverse operation is selected by actuating the sequencing valve 64 such that the valve member 92 is moved into the first position. When the water treatment apparatus 10 is operating in a forward flow direction raw water is received at the first port 88A of the sequencing valve 64 from the main valve 62 and is directed to the third port 88C for communication to the first port 102 of the membrane housings 100. This water passes through all of membrane separators 106A to 106D exiting the housing 100 through the second port 103 as concentrated contaminated water. After exiting the second port 103 the water is received at the fourth port 88D and is directed to the second port 88B. When the water treatment apparatus 10 is operating in a reverse flow direction the flow directions are reversed with raw water being directed to the second port 103 and concentrated contaminated water exiting the housing 100 at the first port 102.

The sequencing valve 62 also allows for the flushing of individual membrane separators. When operated in the second through fifth positions the sequencing valve 62 flushes the individual membrane separators 106A to 106D.

Figure 14:
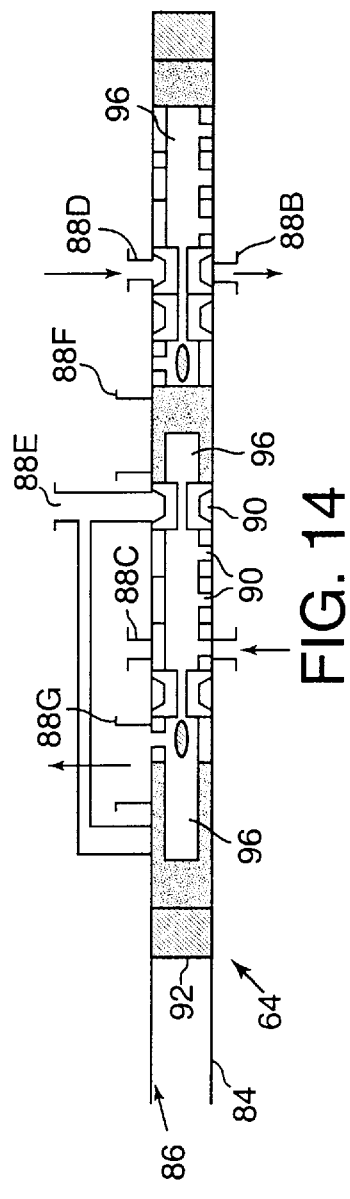
FIG. 14 is a schematic of the sequencing valve showing the sequencing valve in the second position.

Referring to FIGS. 14 the valve member 92 when positioned in the second position directs the flow of raw and recirculated water between the second port 103 and the third flush port 102C of the membrane housing 100. This directs the flow of water across the fourth membrane separator 106D in the series, for flushing the membrane separator 106D in both forward and reverse directions. When the water treatment apparatus 10 is being operated in a forward flow direction the sequencing valve 64 receives water from the third port 76C of the main piston valve at its first port 88A and directs this water to the seventh port 88G which is directed to the third flush port 104C. The water flushes the membrane separator 106C in a forward direction and exits the housing 100 at the second port 103 and is communicated by the ducting 36 to the fourth port 88D. The water is then directed to the second port 88B returning the water via the ducting means 36 to the fourth port 76D of the main piston valve 62. When operating the water treatment apparatus 10 in a reverse flow direction water the flow directions are reversed with flush water being directed to the second port 103 and exiting the housing 100 at the third flush port 104C.

Referring to FIGS. 14 the valve member 92 when positioned in the third position directs the flow of raw and recirculated water between the second flush port 104B and the third flush port 104C of the membrane housing 100. This directs the flow of water across the third membrane separator 106C in the series, flushing the membrane separator 106C in either the forward or reverse direction. When the water treatment apparatus 10 is being operated in a forward flow direction the sequencing valve 64 receives water from the third port 76C of the main piston valve at its first port 88A and directs this water to the seventh port 88G which is directed to the third flush port 104C. The water flushes the membrane separator 106C in a forward direction and exits the housing 100 at the second flush port 104B and is communicated by the ducting 36 to the sixth port 88F. The water then exits through to the second port 88B returning the water via the ducting means 36 to the fourth port 76D of the main piston valve 62. When operating the water treatment apparatus 10 in a reverse flow direction water the flow directions are reversed with flush water being directed to the second flush port 104B and exiting the housing 100 at the third port 104C.

Figure 15:
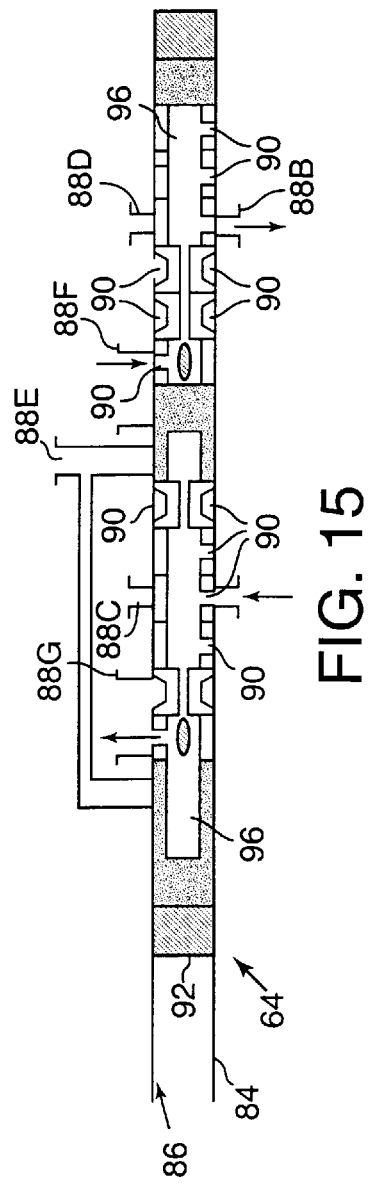
FIG. 15 is a schematic of the sequencing valve showing the sequencing valve in the third position.

Referring to FIGS. 15 the valve member 92 when positioned in the fourth position directs the flow of raw and recirculated water between the first flush port 104A and the second flush port 104B of the membrane housing 100. This directs the flow of water across the second membrane separator 106B in the series, flushing the membrane separator 106B in either the forward or reverse direction. When the water treatment apparatus 10 is being operated in a forward flow direction the sequencing valve 64 receives water from the third port 76C of the main piston valve at its first port 88A and directs this water to the fifth port 88E which is directed to the second flush port 104B. The water flushes the membrane separator 106B in a forward direction and exits the housing 100 at the third flush port 104C and is communicated by the ducting 36 to the sixth port 88F. The water is then exits through to the second port 88B returning the water via the ducting means 36 to the fourth port 76D of the main piston valve 62. When operating the water treatment apparatus 10 in a reverse flow direction water the flow directions are reversed with flush water being directed to the second flush port 104B and exiting the housing 100 at the first flush port 104A.

Referring to FIG. 16 the valve member 92 when positioned in the fifth position directs the flow of raw and recirculated water between the first port 102 and the first flush port 104A of the membrane housing 100. This directs the flow of water across the first membrane separator 106A in the series, flushing the membrane separator 106A in either the forward or reverse direction. When the water treatment apparatus 10 is being operated in a forward flow direction the sequencing valve 64 receives water from the third port 76C of the main piston valve at its first port 88A and directs this water to the third port 88C which is directed to the first port 102. The water flushes the membrane separator 106A in a forward direction and exits the housing 100 at the second flush port 104B and is communicated by the ducting 36 to the fifth port 88E. The water is then exits through to the second port 88B returning the water via the ducting means 36 to the fourth port 76D of the main piston valve 62. When operating the water treatment apparatus 10 in a reverse flow direction water he flow directions are reversed with flush water being directed to the first flush port 104A and exiting the housing 100 at the first port 102.

Referring to FIG. 18, during shutdown of the water treatment apparatus 10 the valve member 92 of the sequencing valve 64 is moved into the sixth position. In the sixth position all the sequencing valve ports are closed and no water flows through sequencing valve 64.

The invention described above has many important aspects and advantages over conventional systems, these are outlined below.

The water treatment apparatus 10 described above utilizes membrane separation technology but does not require any form of chemical pretreatment of the raw inlet water or chemical cleaning of the membrane separators. This is an important improvement over conventional membrane separators in that it eliminates those problems associated with chemical pretreatment and chemical cleaning of the apparatus 10.

The water treatment apparatus 10 allows for operation in both forward flow and reverse flow directions. This provides for more equal wear of membrane separators 106 within a membrane housing 100 and prevents premature membrane wear of the membrane separators 106 arranged at one end of the housing 100 as is the case with conventional membrane separators operating in one flow direction only.

The fast flush cycles can also occur in both the forward flow and reverse flow directions and allow for the efficient flushing of the membrane separators 106A and 106D placed adjacent the ends 112 and 114 of the membrane housing 100. This helps eliminate the need for chemical cleaning.

The membrane housing 100 also includes individual membrane flush ports 104 arranged between adjacent membrane separators 106 placed in series within the housing 100. This allows, when used together with the sequencing valve 64, for the individual flushing of each membrane separator 106 placed within the housing 100 in either forward or reverse flow directions and allows equally efficient flushing of each individual membrane separator 106 placed within the housing 100 regardless of its position within the housing 100. This eliminates the problem of insufficient and ineffective flushing of membrane separators 106 placed at intermediate locations within the series, thus further eliminating the need for chemical cleaning. For example this allows for the individual flushing of the membrane separators 106B and 106C arranged at positions two (2) and three (3) within the housing 100.

The first and second ports 102 and 103 in the membrane separator housing 100 are arranged at 90 degree angles to the membrane separators 106 so that high volume/high pressure jetting of water and solids entering the housing are not directed at the feed ends of the membrane separators 106A and 106D. Preventing this jetting action, which can have highly abrasive effects, helps to reduce wear of the membrane separators 106A and 106D. Having the raw and recirculated water enter at a 90 degree angle also prevents channeling within the membrane separator feed spacer, also reducing the premature wear common in conventional membrane separator housing configurations.

The modifications to the membrane separator spacer 242 design further eliminate the need for chemical pretreatment and cleaning. The spacers 242 have been modified so that larger particulates and sludges are captured at the feed end of the membrane separator spacer 242 and smaller materials are allowed to pass easily through the spacer 242. This is accomplished by utilizing the filtration means 248 at each end of the membrane separator. Particulates, sludge and other solids are captured by the filtration means 248 at the ends of the membrane separator feed spacers. These solids and sludges are easily flushed out during fast flush or reverse flow cycles, rather than becoming trapped within the membrane separator feed spacer main body where flushing may be very difficult. Conventional membrane separator feed spacers exhibit lower solids/sludge capture and flush efficiencies.

The filter means 248 can provide filtration as fine as one micron and will prevent solids from entering the internal areas of the membrane body.

The ability of the water treatment apparatus 10 to be operated in both the forward and reverse flow directions allows for forward and reverse service flow cycling during operation. Cycling the flow between forward and reverse operation clears particulates, sludge, etc. caught by the filter means 248 which further eliminates the need for chemical cleaning of the membrane separators 106. The period of operational time in forward or reverse flow configuration is determined by the particulate and sludge load presented to the membrane separator feed spacers. In the event of high particulate or sludge loads, forward/reverse flow cycle will be very frequent in order to expulse the accumulated load very quickly and before the load exceeds the capacity of the feed spacer capture volume for these particulates and sludges. In the event of low loading, forward/reverse flow cycling may be decreased. Forward/reverse flow cycling may occur as often as every 15 seconds or as infrequent as every eight hours and may be triggered by time settings, pressure monitors triggered by loading or other methods.

The brine seals 252 are arranged at each end of each membrane separator 106 within the housing 100, to force the total water flow through each membrane separator 106 and feed spacer 242 in series, regardless of forward or reverse feed flow direction, and prevent the bypass of water around the outside of a membrane separator 106. Conventional brine seals 252 may be used, with the brine seals 252 reversed on the membrane separator 106 from the conventional positioning to allow water to envelope the outside of the membrane separator 106 equalizing pressure on the inside and outside of the membrane separator 106. This reduces the risk of rupturing of the outer body of the membrane separator 106 during system pressurization. Further, the notches 258 prevent inward rupturing of the membrane separator outer body.

The separation tanks 26 reduce the concentration of solids and sludges in the concentrated contaminated water exiting the membrane separator housing 100. By doing so the amount of this type of material being re-introduced into the recirculation stream and fed back to the membrane separator 106 is reduced. Excessive amounts of these solids can cause premature wear, damage or fouling of the membrane separators 106 by abrasion or accumulation of these solids, sludges, etc. on the separation membranes 234. The separation tanks 26 receive the concentrated contaminated water exiting the housing 100 during both forward and reverse operation and during forward or reverse flushing. Solids, sludges and other contaminates from the concentrate are maintained in the solution or suspension due to the high velocity of the water stream exiting the membrane separator housing 100 during operation. The separation tanks 26 are designed to be considerably larger than the piping carrying the waste concentrate discharge stream thus reducing the velocity of the water stream while the water passes through the tank 26, which in turn causes particulates and sludges present in the water stream to leave the water stream. This reduced velocity is maintained for a pre-determined period of time based upon the nature of the solids and/or sludges to be removed. Removal of these materials reduces wear on the membrane separators and further eliminates the need for the use of chemical cleaners.

The separation tanks 26 may be designed with or without internal components to cause a centrifugal effect to further force solids and sludges to leave the waste concentrate water stream.

The use of the "inverse flow" flush operation further eliminates the need for chemical cleaning of the membrane separators. The inverse flow operation forces high quality water (generally water produced by the membrane separators themselves) through the membrane separator 106 in the inverse direction to that of conventional membrane operation. This operation replaces damaging chemical cleaning of the membrane separators necessary with conventional membrane separator designs and eliminates the associated premature membrane wear, loss of productivity, loss of effectiveness and damage from chemical cleaning.

Although some conventional membrane separators may be operated with inverse flow at low pressures, these conventional membrane separator designs are often not structurally sound, even at low pressures, during this type of operation because of the method of sealing of the water permeable membrane thin-film layer 236 and water conducting layer 238 to themselves or to the product carrier duct 240. In the present invention special membrane construction is utilized to allow inverse flow at high pressures, thereby increasing the effectiveness of the inverse flow process. In the present invention inverse flow pressures typically range from 10% of the operating pressure to 100% of the operating pressure.

Membrane construction is improved to provide enhanced resistance to high pressures during inverse flow by using advanced adhesives, such as advanced epoxy adhesives or other high strength and chemically resistant adhesives, together with advanced sewing techniques with chemically resistant and strong thread materials for sealing the water permeable layer 236 and product conducting layer 238 to each other and to the product central carrier duct. Closely placed thread patterns, assisting the advanced adhesives utilizing high strength and resistant plastic or metallic threads prevent membrane sheet separation during inverse flow.

The membrane separators 106 are made further resistant to the high pressures used during inverse flow by the improved arrangement of the brine seals 252 and notches 258. The outer casing 243 of the membrane separator 106 may also be strengthened by reinforcing or creating a stronger external body to prevent rupturing. Such reinforcing materials as Kevlar, steel or stainless steel mesh or advanced plastics or fiberglass, among others, may be used for external body strengthening.

Chemical cleaning the membrane separators 106 is further reduced by maintaining the membrane separators 106 in clean water during system shut-down in order to prevent fouling or "cementing" of the separation membrane 234 and/or the spacers 242. Prior to the water treatment apparatus 10 system shut-down, an inverse flow cycle is initiated, ensuring that the membrane separators 106 are bathed in and maintained in a fresh water solution and that contaminates are expulsed from the separation membrane 234 and feed spacers 242. The entire apparatus 10 as well as the separators 106 may be bathed in and maintained in a fresh water solution in this manner.

The present water treatment apparatus 10 operates at a fraction of the horsepower of conventional membrane separator designs and exhibits higher product water outputs per given membrane separator quantities, while maintaining the recommended membrane manufacturer's recovery limit of 10% to 15%.

The main drive and recirculation pumps 18 and 28 are selected to be of sufficient size to maintain over-all product water recovery to total system flow ratios of no more than 10% to 15% as recommended by conventional membrane separator manufacturers. To acheive this ratio a main drive pump 18 capable of providing sufficient flow at the desired operating pressure to supply the total product water flow plus the total desired concentrate waste flow is placed together with a recirculation pump 28 capable of providing a recirculation flow across the membrane separators of no less than 10 times the total recovered product water flow minus the total flow from the main drive pump 18. This results in flow across the membrane separators 106 equal to no less than 10 times the product water output and assures no more than a 10% recovery ratio as specified by conventional membrane manufacturers.

The recirculation pumps 28 may alternatively be selected to provide water flow across the membrane separators of at least 2 times the main drive pump flow. This will result in recovery ratios greater than 10% but will increase wear on the membrane separators and is therefore not recommended.

Utilizing the main drive pump 18 and the recirculation pumps 28 in an arrangement to provide no more than a 10% to 15% recovery ratio described above results in greater energy efficient for the system. This is achieved in the following manner.

The main drive pump 18 only pressurizes an amount of flow equal to the treated water flow plus concentrated final waste flow instead of the total system plus recirculation flow. The recirculation pump 28 provides for the remaining flow, but need only operate at the pressure differential between the inlet side of the membrane separators 106 and the outlet side of the membrane separators 106. The pressure drop across the membrane separators 106 is known as trans-membrane pressure drop and is variable depending upon the size and type of membrane feed spacer 242 utilized but does not normally exceed 20 psi when properly selected. An accumulator is necessary to balance the flow requirements of the recirculation pump 28, especially during initial membrane separator start-up. The separation tanks 26 may be utilized as the accumulator.

A conventional membrane separator configuration would require the following energy and horsepower inputs to meet conventional membrane manufacturer's requirements:

|  | FULL RECIRCULATION | NO RECIRCULATION |
|---|---|---|
| CONDITION: | SEA WATER, 30,000 TDS | SEA WATER, 30,000 TDS |
| OPERATION PRESSURE: | 850 PSI | 850 PSI |
| REQUIRED PRODUCT WATER FLOW: | 1 USGPM | 1 USGPM |
| REQUIRED MEMBRANE TOTAL: FEED FLOW | 10 USGPM | 10 USGPM |
| TOTAL MAIN DRIVE PUMP FLOW | 10 USGPM | 10 USGPM |
| RECIRCULATION FLOW: | 8 USGPM | 0 USGPM |
| WASTE FLOW: | 1 USGPM | 9 USGPM |

$$\frac{\text{TOTAL MAIN DRIVE} \times \text{PRESSURE PUMP FLOW}}{\text{MOTOR HORSEPOWER FACTOR}} = \frac{\text{THEORETICAL HORSEPOWER MOTOR EFFICIENCY}}{} = \text{REQUIRED HORSEPOWER}$$

Therefore, under the above conditions, the horsepower requirements of a membrane separator operating in a conventional manner with an air-cooled motor and centrifugal pump would be:

$$\frac{10 \times 850}{1560} = \frac{5.45}{0.60} = 9.08 \text{ HORSEPOWER per GALLON PER MINUTE PRODUCED}$$

Under these same conditions, employing the two pump system described the following energy requirements would be indicated:

HORSEPOWER FORMULA:

$$\frac{\text{TOTAL MAIN DRIVE} \times \text{PRESSURE PUMP FLOW}}{\text{MOTOR HORSEPOWER FACTOR}} = \frac{\text{THEORETICAL HORSEPOWER}}{\text{MOTOR EFFICIENCY}}$$
$$= \text{REQUIRED HORSEPOWER}$$

Plus $$\frac{\text{TOTAL CONC/RECIRC TOTAL} \times \text{PRESSURE PUMP FLOW}}{\text{MOTOR HORSEPOWER FACTOR}} = \frac{\text{THEORETICAL HORSEPOWER}}{\text{MOTOR EFFICIENCY}}$$
$$= \text{REQUIRED HORSEPOWER}$$

OR:

$$\frac{2 \times 850}{1560} = \frac{1.09}{0.60}$$
$$= 1.82 \text{ HORSEPOWER per GALLON PER MINUTE PRODUCED}$$

Plus $$\frac{8 \times 20}{1560} = \frac{0.10}{0.60}$$
$$= 0.17 \text{ HORSEPOWER per GALLON PER MINUTE PRODUCED}$$

This gives an over-all required horsepower of less than 1.99 in order to perform the same function of a conventional membrane separator operating to the membrane manufacturer's specifications in this configuration with air-cooled motors and centrifugal pumps, providing a total energy and horsepower savings of more than 78% with only this one advance over conventional membrane separator technology and design.

Submersed, water-cooled centrifugal pumps are utilized for both the main drive pump 18 and the recirculation pump 28. Submersed, water cooled centrifugal pumps operate at higher efficiencies (more than 70% efficiency) than air-cooled centrifugal pumps (at 60% efficiency) and, therefore, require lower horsepower to produce the same work. Applying submersed, water cooled centrifugal pumps to the above situation results in a total horsepower requirement of less than 1.71. This represents a savings of more than 0.28 horsepower over the utilization of air-cooled motors in the configuration shown above and a total savings of more than 7.37 horsepower (more than 81%) when compared to conventional membrane separators operating at the manufacturer's recommended recovery limit.

a membrane separator increase by as much as 2% to 3% for every degree Celsius (every 1.8 degrees Fahrenheit) that the water temperature increases above the maximum density of water with conventional membrane separators at a given and equivalent pressure. A net feed water temperature increase of 3 or 4 degrees Celsius (5 to 7 degrees Fahrenheit) can result in an increase of final recovered product flow of as much as 10%.

Heat produced by pump motors is used to increase membrane separator efficiency and is maximized by utilizing pumps having submersible and water cooled motors and by employing pump/motor housings optimized to facilitate this heat recovery.

While initially pressurizing the raw inlet feed water stream, all centrifugal booster pump/motor combinations produce heat that must be dissipated. While producing the required recirculation flow as presented as an object of this present invention, all recirculation pump/motor combinations produce heat that must be dissipated. This heat energy is virtually completely lost with air-cooled motors incorporated in conventional membrane separator designs.

Retained heat energy available is minimal with conventional submersible and water cooled pump/motor housings,

HORSEPOWER FORMULA:

$$\frac{2 \times 850}{1560} = \frac{1.09}{0.70}$$
$$= 1.56 \text{ HORSEPOWER per GALLON PER MINUTE PRODUCED}$$

Plus $$\frac{8 \times 20}{1560} = \frac{0.10}{0.70}$$
$$= 0.15 \text{ HORSEPOWER per GALLON PER MINUTE PRODUCED}$$

Membrane separators produce higher volumes of final recovered product water at higher temperatures. As temperatures rise above the point of maximum density of water (04° C. or 39° F.), final product water recovered at a given operating pressure increases. This is a well understood process and phenomenon. Final product water volumes from as these conventional housings are designed specifically to rapidly dissipate heat. Heat energy available from conventional pump/motor combinations is also minimal as conventional pump/motor combinations are devised to minimize the heat produced by the pump motor in order to prevent possible over-heating of the motor.

Due to these factors, even if a conventional membrane separator design were to incorporate submersible and water cooled centrifugal pumps in the design, effectiveness would be minimal as the pump/motor combinations would produce very little heat and the conventional pump/motor housings would rapidly dissipate this heat. The raw water inlet pressure booster pump/motor housings incorporated within this present invention as well as the concentrate/recirculation pressure/flow booster pump/accumulator sets are optimized to retain as much heat produced by the submersible and water cooled motors as possible and to transfer as much of this heat to the water stream as possible.

Pump/motor housings, the separation tanks 26, the transfer ducting 36 and associated components are constructed of plastics exhibiting good insulating properties, such as high density polyethylene, where possible, and heavy gauge aluminum, steel or stainless steel where the use of plastics is not possible. Other plastics or metal materials of construction are possible, but the key factor is the insulating properties and their ability to retain heat, rather than transfer the heat to atmosphere.

For a given flow an optimal depth of water and speed over the submersible motor produces an optimal heat transference to the water, maximizing heat transference from the motor to allow motor cooling while also maximizing the temperature increase of the water stream flowing over the motor. This is very important to both motor cooling and system efficiency with heat insulated pump/motor housings and componentry.

The raw water will only pass once by the main drive pump as this pump/motor operates at the total flow of system product water flow plus the system waste water flow. The recirculated water will pass by and around the recirculation pump motor four times for each time the raw water passes the main drive pump, as this pump/motor provides flow of at least four times the raw inlet feed booster pump flow rate. This provides significant heat introduction into the water stream.

In order to further increase heat transference, all pump/motor combinations can be selected with smaller motors than recommended by the pump manufacturer so that the motors, in service conditions, are operating within their rated service factors and, therefore, operate at higher temperatures, producing more heat to be transferred to the solution.

The combination of the pump/motor housings, accumulators and transfer piping/componentry material selection and design together with the pump/motor combinations selected for operation are designed to cause an increase in membrane feed water temperature of at least 3 to 4 degrees Celsius (5 to 7 degrees Fahrenheit) and, therefore and increase in final recovered product water volumes by no less than 10% more than conventional membrane separator system designs per equivalent membrane quantity. This allows the selection of fewer membranes and associated increases in membrane separator efficiencies.

The extremely water-wasteful membrane separator fast flush cycles of conventional membrane separators have been eliminated in the water treatment apparatus 10 operate at high recoveries, and, to maintain high over-all raw feed water recovery. High recovery is defined as operation where the great majority of the raw feed water inlet stream becomes final recovered product water (no less than 50%) and/or where the concentrated waste stream approaches saturation of one or more of the undesirable contaminating ions present, such as calcium, iron, silica or sulphates, oils, organics, etc.

A major problem with membrane separators operating in the conventional manner is that contaminates initially present in a solution in a dissolved form as well as solids, sludges, organics and oils present in a suspended or fluidized form within a solution will leave the solution as water is extracted and the contaminates become concentrated within the remaining water volume. This severely limits the recovery capabilities of conventional membrane separators to at or below the level of saturation under static (zero pressure, zero flow) conditions. Operation of a conventional membrane separator at levels above saturation will quickly foul and plug the membrane separators, necessitating damaging chemical cleaning.

At levels slightly below saturation, dissolved contaminates, solids, sludge and other materials will generally be maintained in suspension or dissolved within a solution while process flows are high and the concentrated waste stream is maintained under high flow and pressure conditions as is the case within a single pass, low recovery system that does not recirculate and concentrate. Once the pressure and flow are reduced or stopped within any conventional membrane system, concentrated solids, sludges and other materials readily leave solution and accumulate on the water permeable layer and within the membrane separator feed spacers, again causing membrane plugging, fouling and blockage that can only be remedied by extremely water wasteful fast-flushing of the membrane separators and/or damaging chemical cleaning of the membrane. Due to this, conventional membrane separators are restricted to recoveries that will not concentrate the raw inlet feed water solution beyond saturation of dissolved contaminates, sludge, oils, organics or other materials under static conditions.

If the conventional membrane separator design incorporates concentrate water recirculation under high recovery conditions, the problem is magnified. Contaminates, solids, oils and organics will come out of the concentrated waste solution, if saturation is reached, when the pressure of the concentrate stream is reduced to the lower raw water inlet feed pressure as the concentrate enters and mixes with raw inlet feed water at the inlet to the raw inlet feed water pressure booster pump. Once out of solution, these materials will be presented as abrasive solids and sludge to the membrane separators causing abrasion damage and accumulation on the membrane separator thin-film surfaces and within the membrane separator feed spacers. This will shorten the life of the membrane separator, cause irreversible membrane damage and loss of efficiency as well as necessitate water wasteful fast flush cycles and damaging chemical cleaning of the membrane separator.

It is not uncommon, with conventional membrane separator designs to require 10% or more of the available raw water volume for fast-flush cycles alone. This means that, even at an apparent operation of 50% recovery (1 gallon per minute of product is produced for every 1 gallon per minute of final waste during system operation), once the waste water necessary for fast flush is considered, actual recovery is much lower. In the instance of 10% raw water being necessary for fast flush, per 100 gallons of raw water made available to the processor the following actual conditions occur:

a) 10 gallons waste is produced from fast flushing
b) 45 gallons of waste is produced as concentrated waste during system operation
c) 45 gallons of final recovered product water is produced This results in an actual recovery of only 45% from a conventional membrane separator and a water wastage of 55%, while operating at an apparent recovery of 50%, even without considering the water wastage produced by required chemical cleaning cycles.

The recirculation pump 28 coupled with separation tank 26; advanced membrane feed spacer design; forward/reverse flow service cycling; forward and reverse flow internal fast flushing; advanced waste discharge stream handling; advanced system control; and, inverse flow cycles to prevent membrane separator thin-film surface and membrane separator feed spacer plugging and fouling from occurring. This eliminates the need for damaging chemical cleaning and water wasteful fast flush to waste cycles.

During service operation, the pressurized raw feed water stream first travels to one feed end of the membrane separator(s). The spacers 242 are designed to capture solids and sludges at the feed end of the membrane separator and to prevent solids and sludges from entering further into the feed spacer 242 and membrane separator 106. The concentrated contaminate water from the membrane separator(s) exits via piping at high flow velocities and is directed to the separation tanks 26.

Once a pre-determined time, pressure drop or other control cycle limit is met, service flow to the membrane separator(s) 106 is reversed. Raw inlet feed water is fed to the opposite end of the membrane separator(s) where solids and/or sludges are captured and prevented from entering further into the filtration means 248 and membrane separator 106. Solids and sludges that had been captured by the filtration means 248 at the end previously in service, together with the normal concentrated waste stream, are expelled via piping at high velocities to separation tanks 26, as the flow through the membrane 106 has been reversed. Forward/reverse service flow cycle duration is set based upon the load presented to the filtration means 248 end.

Concentrate water exiting membrane separators 106 is always at lower pressure than the initial pressure fed to the membrane separators feed end, as pressure drop occurs as the raw feed water travels through the membrane separators 106 and filtration means 248. This pressure drop is controllable and is normally controlled between 20 to 40 psi. A solution at lower pressure or lower velocity cannot retain as high a contaminate load as a solution at higher pressure and higher velocity, therefore, contaminates, organics and oils that may remain in solution or suspension at higher pressures and flows at the feed end of the membrane separator 106 may leave solution as these pressures and flows decrease. This separation of solids is further magnified by the concentration of contaminates, solids, sledges, organics and oils within the waste stream and the over-all increased contaminate load due to the fact that water is extracted throughout the membrane separator body itself to become final recovered product water.

Upon exiting the membrane separator(s) 106, the contaminates, solids, sledges, and concentrated waste stream travel at high velocities through transfer piping, to help maintain the contaminate load fluidized in suspension, and then enter the separation tanks 26. The velocity of the water stream decreases significantly as it enters the separation tanks 26, to pre-determined levels due to the design of these tanks 26. The combination of the decrease in velocity, the design of the tanks 26 and the time spent at this lower velocity causes separation of suspended and/or fluidized solids, super-saturated contaminates, organics, oils, etc. The design of the separation tanks 26 are also optimized to assist in the separation of these saturated contaminates, solids, organics and/or oils from the concentrate water stream through centrifugal action.

These separated solids and other contaminates and materials do not re-enter the recirculated water stream and, therefore, do not cause membrane separator 106 fouling or plugging. Because the solids, sludge, oils, organics, etc. are separated from the recirculated water stream and collected within the separation tanks 26 during system service as a normal function of system service, water wasteful fast flush cycles become unnecessary.

As all water treatment apparatus utilizing membrane separators have some continuous waste discharge stream in order to expulse salts and to prevent dissolved salts from accumulating beyond acceptable levels, it would be ideal if this waste stream could consist of as high a level of the extracted solids and sludge as possible. In order to facilitate this, the waste concentrate discharge stream is taken from the flush port of each separation tank 26, allowing a majority of the collected solids and sludge to exit the tank 26 during service operation The water exiting the separation tanks 26 is virtually free of solids and contaminates that have left solution prior to entering the recirculation pump set 28. The resultant water stream exiting the separation tanks 26 is re-pressurized by the recirculation pump set 28 back to the system operating pressure and is recirculated through the membrane separators 106 again and, therefore, no water is lost or wasted. The water pressure and velocity is increased within these pumps, re-dissolving and/or re-fluidizing any contaminates that might be remaining and preventing these from causing fouling or plugging of the membrane separators 106.

Operation in this manner allows operation with saturated solutions that would be very destructive and damaging to conventional membrane separators. It is possible, in most applications, to operate at raw inlet feed water recovery levels as high as 90%, or more, applying this method together with correct membrane selection and application.

Collected solids within the separation tanks 26 are expelled during clean in place cycles, via either pump assisted drain or gravity drain with very little water wastage, as less than 50% of the volume of the separation tank 26 must be displaced in order to clear accumulated solids.

When the separation tanks 26 reach a point where they must be purged, separation membrane 234 cleaning will also be required. At this time an inverse flow cycle is triggered. The product water accumulator 24 is employed to regulate the volume of water used during inverse flow operation for purging and cleaning the membrane separator(s) 106. The inverse flow cycle purges contaminates and concentrated raw water from the membrane separators 106 and membrane separator housings 100. As the volume contained within the product accumulator 24 is fixed, only that fixed volume of water is used during an inverse flow cycle. If, as in the standard configuration, the volume of water contained within the product accumulator is sized at 4 times the total volume of water entrained within the membrane separators 106 and housings 100 in standard applications (even though larger or smaller volumes are possible), an equivalent of 4 membrane separator inverse flushes is performed and the membrane separators are maintained in a fresh water bath until the next service cycle begins.

In standard configurations, the volume of water contained in the product water accumulator 24 is equal to 50% of the volume of water contained in the separation tanks 26, ensuring an ideal volume for flushing collected solids, sludge and other materials from the tanks 26 while minimizing water wastage.

As the inverse flow cycle causes product water to run inversely through the membrane separators 106 (product enters the membrane separator product water core, then passes in the reverse direction through the membrane separator thin film), the membrane separator thin film surface is cleared of any contaminates or film that may have begun to form at the membrane surface.

During the next service cycle, the product water produced by the membrane separator(s) 106 flows into product accumulator 24 prior to exiting the system to final use or storage, re-filling the product accumulator 24. The volume of the product water accumulator 24 is equivalent to 4 times the water volume entrained within the membrane separator housing(s) 100, 0.5 times the volume contained within the separation tanks 26 in the standard design and less than 4 minutes of recovered product water production during system operation. Even if an inverse flow cycle were to be initiated every two hours of system service operation, only 4 minutes out of 120 minutes of operation would be wasted, or less than 3.5%. This represents a significant savings over conventional fast flushing water wastage.

Product water used during inverse flow functions is retained within the system 10 and is further utilized to flush any remaining particulates from the separation tanks 26 and providing high quality water within the tanks 26 for re-processing and flushing of the system at the next service cycle.

The concentrated waste from the membrane separators 106 and membrane separator housings 100 that exits during the first period of operation of the inverse cycle process is displaced to the separation tanks 26. The separation tanks 26 flush valve 200 is opened, allowing accumulated solids, sledges and other contaminates to flow to drain. The balance of the water exiting the membrane separators 106 and housings 100 is relatively pure water and this relatively pure water is used to displace an equivalent volume of concentrated waste from the separation tanks 26 as well as to flush any remaining solids from the tanks 106.

This allows the relatively pure water to be retained within the system and to be re-processed once the water treatment apparatus 10 resumes service operation cycling. In this manner, only the water volume contained within the product accumulators 24 is lost to drain, rather than excessive volumes necessary with conventional fast flushing, during flush/purge cycles and the high quality water used during inverse flow operation is retained within the system for re-processing.

Since virtually all water treatment apparatus 10 components are bathed in high quality water and, at service cycle start-up, this high quality water flushes through the membrane separators 106 and provides a high quality rinse prior to the raw influent water presenting a load.

Utilizing valves of the ec valve type reduces capital costs and are simpler than complex valve sets used in conventional membrane separator technologies. Two dedicated single piston multi-function piston valves are employed to replace more than 15 conventional automated single port valves. This reduces the capital cost of valves, piping and frame manufacturing costs, control costs, as well as reducing the physical size of the advanced membrane processor design.

The main control valve 62 is capable of carrying out all functions of the advanced membrane separator operation at pressures ranging from flooded suction to more than 1,500 PSI and in flow ranges from 15 USGPM to more than 3,000 USGPM. The main control valve 62 further eliminates the service, maintenance and upkeep that would otherwise be required with conventional automated valves. Employing the main control valve 62 in place of conventional automated valves also reduces piping requirements significantly. Each major system component and device within the advanced membrane separator design attaches to a dedicated port located on the main control valve 62, eliminating otherwise required manifolding and piping to valve nests. Costs incurred for the main control valve 62 manufacture are more than off-set by savings in piping and construction costs. The main control valve 62 only requires a single drive motor and positioning switches for each operating position. This significantly reduces control costs and complexity, again saving considerable costs when compared to the control requirements of conventional automated valves and position indicators. The main control valve 62 also simplifies the installation, start-up, maintenance and trouble-shooting procedures of the advanced water treatment apparatus 10.

Ensuring proper placement and orientation of nested conventional automated valves involves considerable time and effort during start up and commissioning. The complicated lay-out of nested valve sets also makes operator training very difficult. Trouble-shooting problems associated with automated valve actuator failure and seal failure can be very time consuming and labor intensive. Maintenance of multiple valve actuators and seals can also be laborious.

The main control valve 62 requires only one valve actuator and an operator can easily identify a positioning problem and understand the positions and functions of the valve, greatly reducing operator training time. When valve seal service is required, the piston may be removed from the valve body and all seals requiring service replaced at the same time, greatly reducing maintenance costs and labor.

The sequencing valve 62 is also a valve of the ec valve type. The sequencing valve 62 has operating pressure capabilities ranging from flooded suction to more than 1,500 PSI with flow ranges from 15 USGPM to more than 3,000 USGPM. Sequencing valves 64 may be constructed for any practical number of membrane separators 106. By manifolding membrane separator housings 100, the sequencing valve 64 operates as many membrane separator housings 100 in parallel as the flow rate allows.

The sequencing valve 64 replaces no less than 10 conventional automated single port valves that would otherwise be required to perform all of the flush and service functions of the advanced membrane separator processor having four (4) membrane separators 106 in series, at a small fraction of the cost of the conventional automated valves. A sequencing valve 64 further eliminates the service, maintenance and upkeep that would otherwise be required with conventional automated valves.

Employing the sequencing valve 64 in place of conventional automated valves also reduces piping requirements significantly. Each port of the membrane separator housing within the advanced membrane separator design attaches to a dedicated port located on a the sequencing valve 64, eliminating otherwise required manifolding and piping to valve nests. Costs incurred for sequencing valve 64 manufacture are more than off-set by savings in piping and construction costs.

A sequencing valve 64 only requires a single drive motor and positioning switches for each operating position. This significantly reduces control costs and complexity, again saving considerable costs when compared to the control requirements of conventional automated valves and position indicators.

The sequencing valve 64 also simplifies the installation, startup, maintenance and trouble-shooting procedures of the advanced membrane separator device.

Insuring proper placement and orientation of nested conventional automated valves involves considerable time and effort during start up and commissioning. The complicated lay-out of nested valve sets also makes operator training very difficult. Trouble-shooting problems associated with automated valve actuator failure and seal failure can be very time consuming and labor intensive. Maintenance of multiple valve actuators and seals can also be laborious.

The sequencing valve 64 requires only one valve actuator and an operator can easily identify a positioning problem and understand the positions and functions of the valve, greatly reducing operator training time. When valve seal service is required, the piston may be removed from the valve body and all seals requiring service replaced at the same time, greatly reducing maintenance costs and labor.

Advanced membrane separator housings 100 can be constructed inexpensively compared to conventional membrane separator housings.

The advanced pump housings 46 and 212 can be constructed as inexpensively as conventional submersible pump/motor housings.

Savings on operating costs and the savings on otherwise required pre-treatment devices more than offset the costs involved with the inclusion of separation tanks, product accumulators, recirculation pumps and inverse flow pump 25.

The water treatment apparatus 10 operates without a continuous waste discharge stream. The continuous water discharge stream from a membrane separator operated in the conventional manner is the most water wasteful aspect of the system. Generally, more than 50% of the available raw inlet feed water volume is wasted as a concentrated discharge stream.

Turning now to FIGS. 35 through 41, there is shown further detail of the valve construction for use in providing the functions of the valve schematically shown in FIG. 4 through 18.

The valve 300 comprises a valve body 301 and a valve member 303 in the form of a spool which slides along an interior bore 302 of the body 301.

The spool 303 has a main cylindrical outer surface which is machined to define a series of axially spaced recesses or grooves around the periphery of the spool.

The valve body is formed from a series of axially separated, coaxially arranged valve portions. In the embodiment shown there are two end valve portions 304 and 305 together with a plurality of intermediate valve portions. All of the valve portions are clamped together by four tie rods 306 arranged around the periphery and extending from one end of the valve body to the other end of the valve body.

Figure 38:
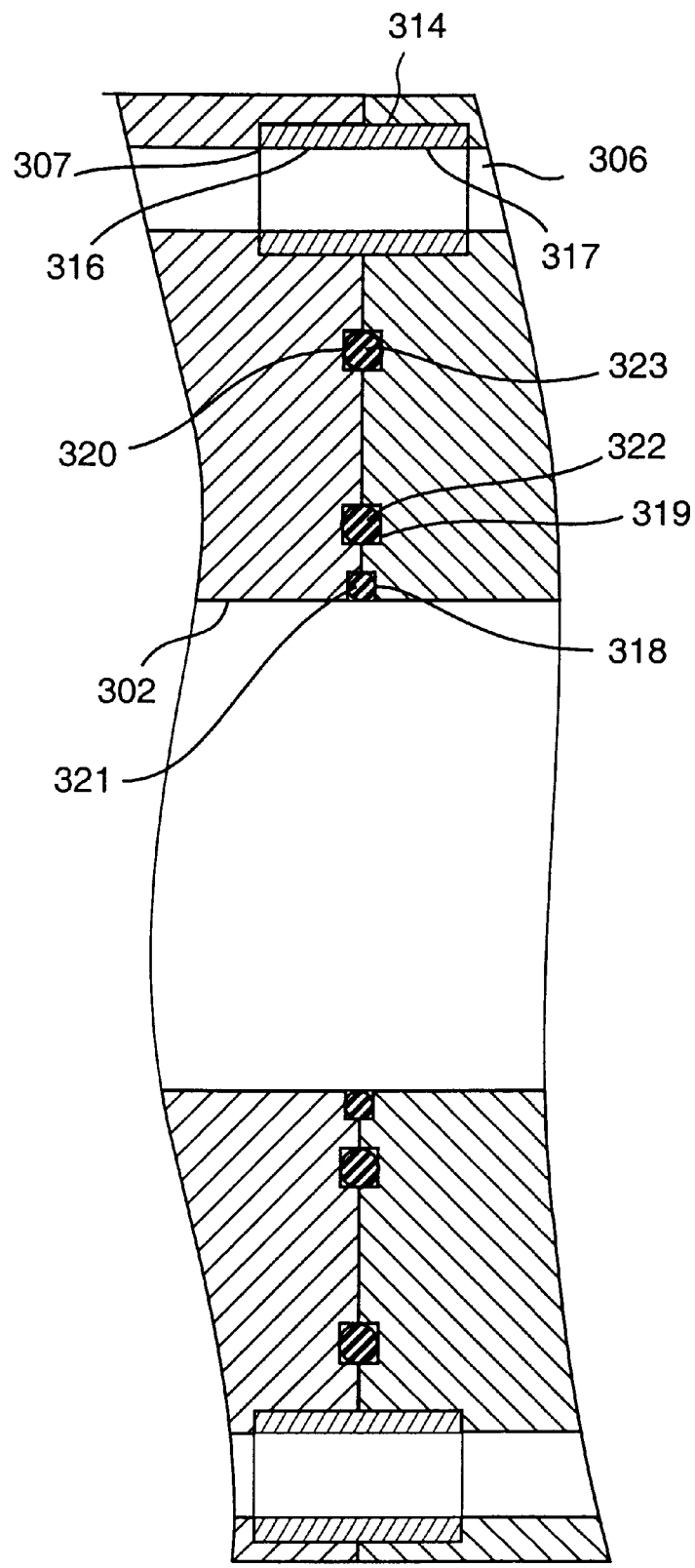
FIG. 38 is a cross-sectional view along the lines 38—38 of FIG. 36.
Figure 39:
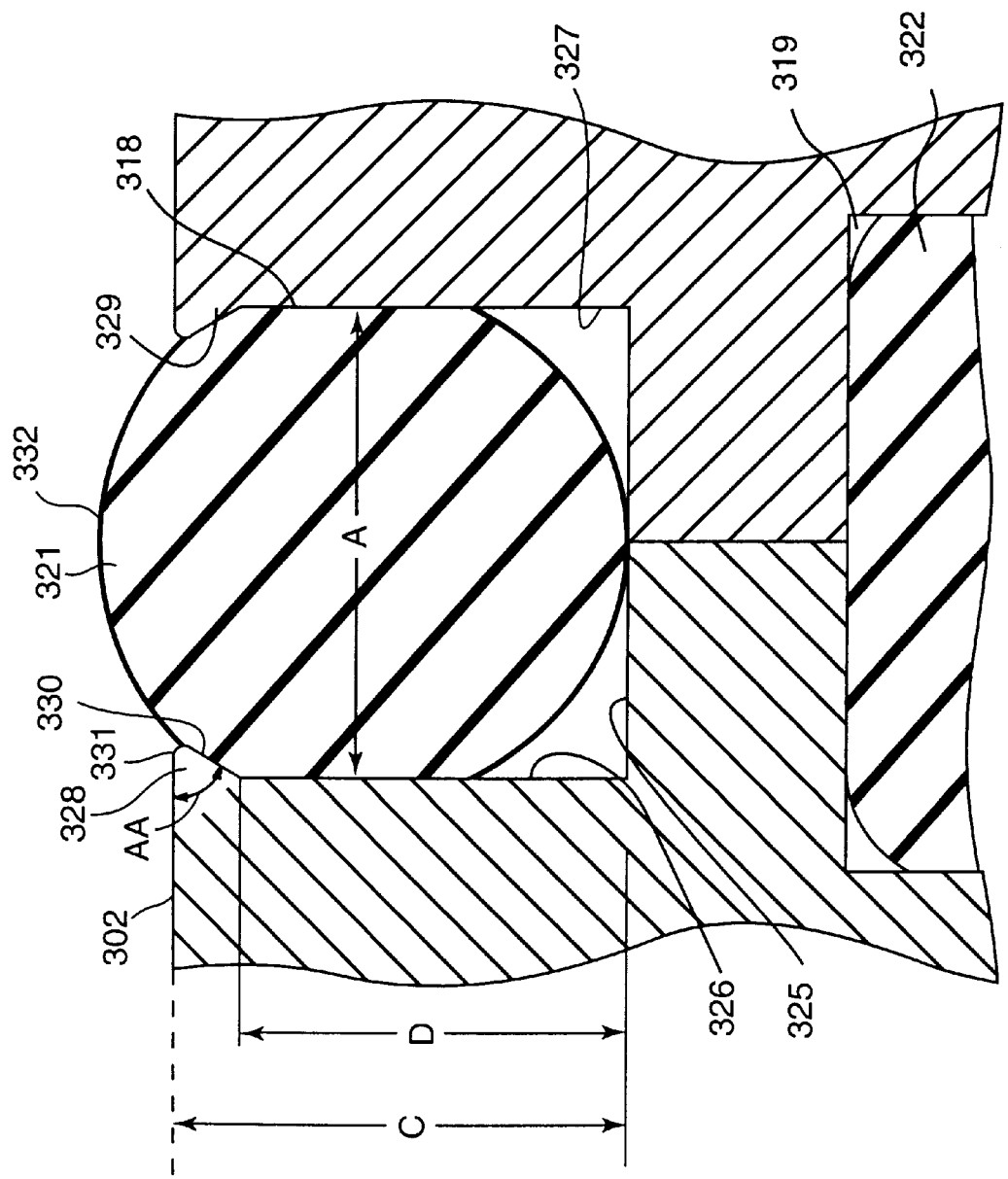
FIG. 39 is a cross-section through the C ring and groove only of the valve of FIG. 35 for use with a high pressure application.
Figure 40:
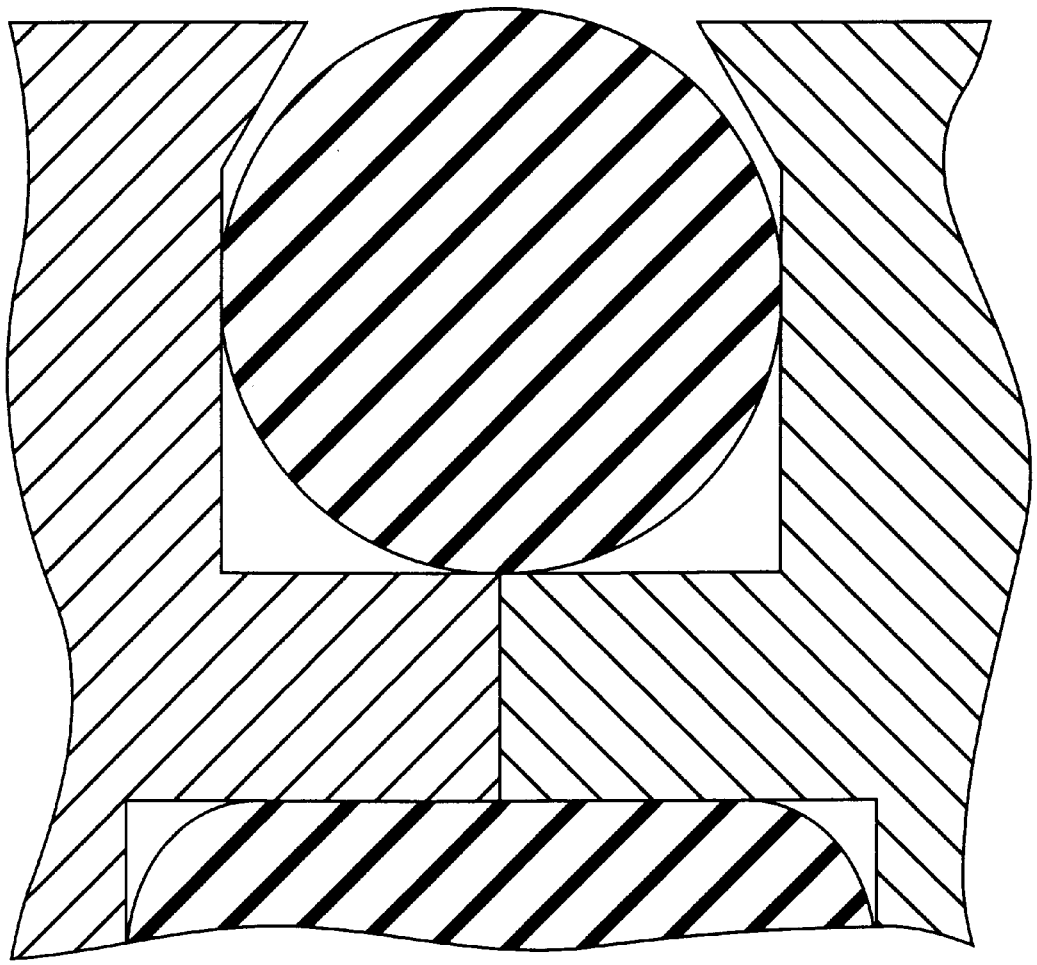
FIG. 40 is a cross-section through the O ring and groove only of the valve of FIG. 35 for use with a low pressure application.

The valve portions are separated at radial planes so that each valve portion has two end faces lying in a radial plane of the axis of the valve so that the two end faces of abutting portions are clamped together as best shown in FIGS. 38, 39 and 40.

Each port of the valve has its own valve portion. There are also intermediate valve portions which do not have ports which are arranged to provide spacing of the ports sufficient to co-operate with the recesses of the spool to void communication of fluid between particular ones of the ports.

The valve can therefore be built up from a series of selected valve portions to form a valve of the required complexity with the required number of ports and the required arrangement of the ports for particular communication and control of the liquid. The details of the ports and their arrangement is described hereinbefore.

Figure 36:
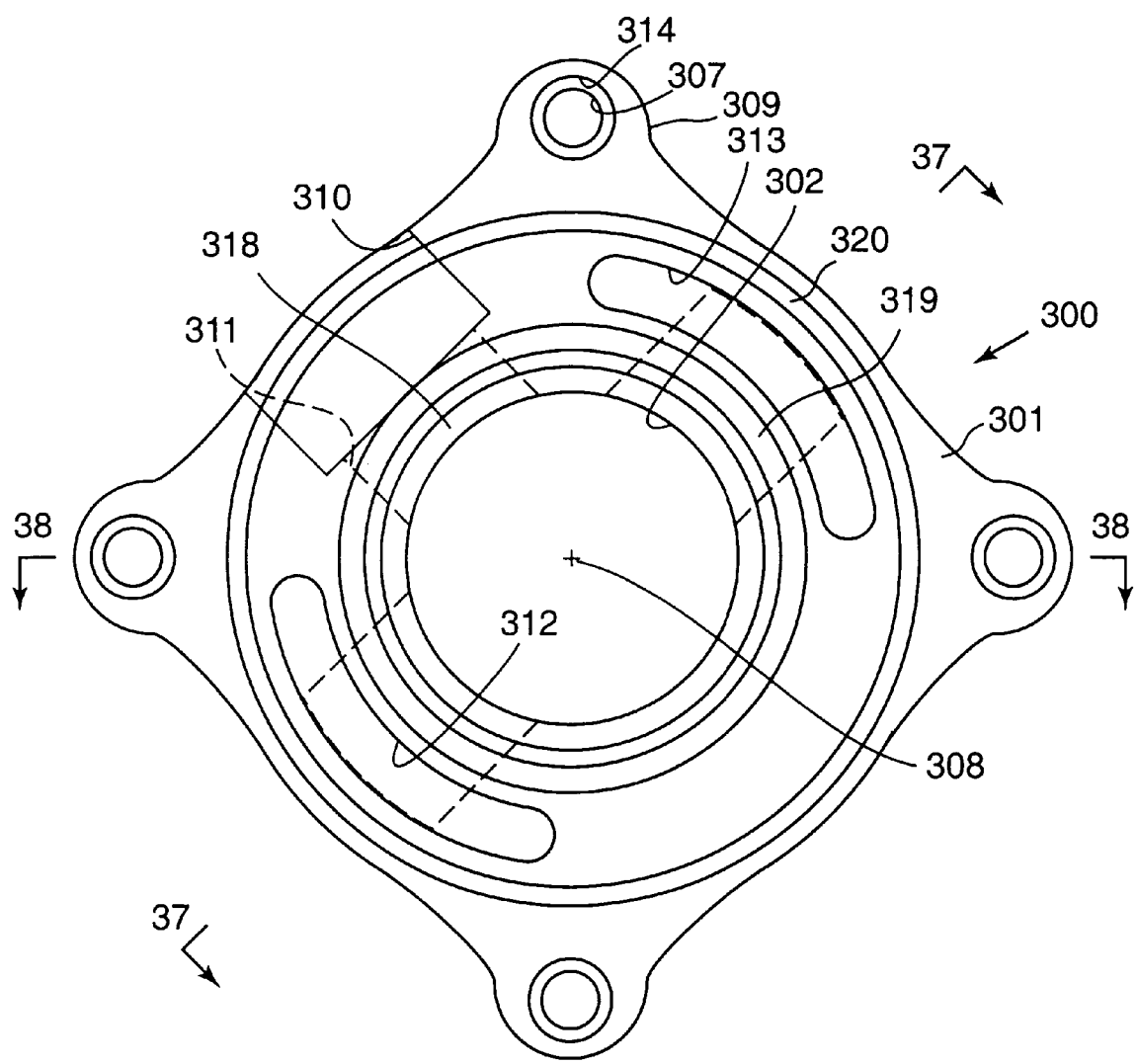
FIG. 36 is an end elevational view of the end face of one of the valve portions of the valve of FIG. 35.

In FIG. 36 is shown the end face of one of the valve portions. Each valve portion thus includes a bore 307 at spaced positions around the axis 308 for receiving a respective one of the rods 306. In the example shown there are four such bores 307 and each is provided on an ear 309 projecting outwardly from the outer periphery of the body 301. In an arrangement which is machined and drilled, the outside of the body is cylindrical and the bores are located inwardly of the outer cylindrical surface to reduce machining.

Those valve portions which have a port include the port 310 at one side communicating inwardly through a channel 311 to the central bore 302. The port 310 can receive a welded or threaded pipe.

Many of the valve portions include a pair of channels 312, 313 extending axially of the valve for communicating liquid along the valve from one port to another. The channels 312 and 313 are arranged angularly spaced from the ports 310 through the portions shown in FIG. 36 so that the channels bypass the port 310 of that valve portion and communicate further through the valve to other ones of the valve portions as required in accordance with the required plumbing arrangement.

At each end face, around the bore 307 is formed a counter bore 314. In the end face of one of the valve portions is inserted a dowel pin 316 into the counter bore so that a part of the dowel pin extends into the counter bore of one valve portion with an end of the dowel pin extending outwardly from that end face for engagement into the counter bore of the next adjacent valve portion. The dowel pins are formed with an accurate outside surface and the counter bores are machined accurately so that the dowel pins are used to align the valve portions end to end to ensure that the central bore 302 is continuous along the length of the valve without steps between each valve portion and the next adjacent valve portion. The rod 306 is then inserted through a hollow bore 317 in each of the dowel pins and the rod 306 can be relatively loose fitting to allow easy sliding action through the valve body since it does not itself act to align the valve portions.

In the end face of each of the valve portions is provided a series of grooves each for receiving an O ring. Thus in the portion shown in FIGS. 36, 37 and 38 there are provided three grooves indicated at 318, 319 and 320. Each of these grooves has one half formed in the end face of one valve portion and one half formed in the end face of the opposed valve portion so that when the valve portions are clamped together the grooves align and thus form an annular receptacle for receiving a respective O ring 321, 322 and 323.

Figure 37:
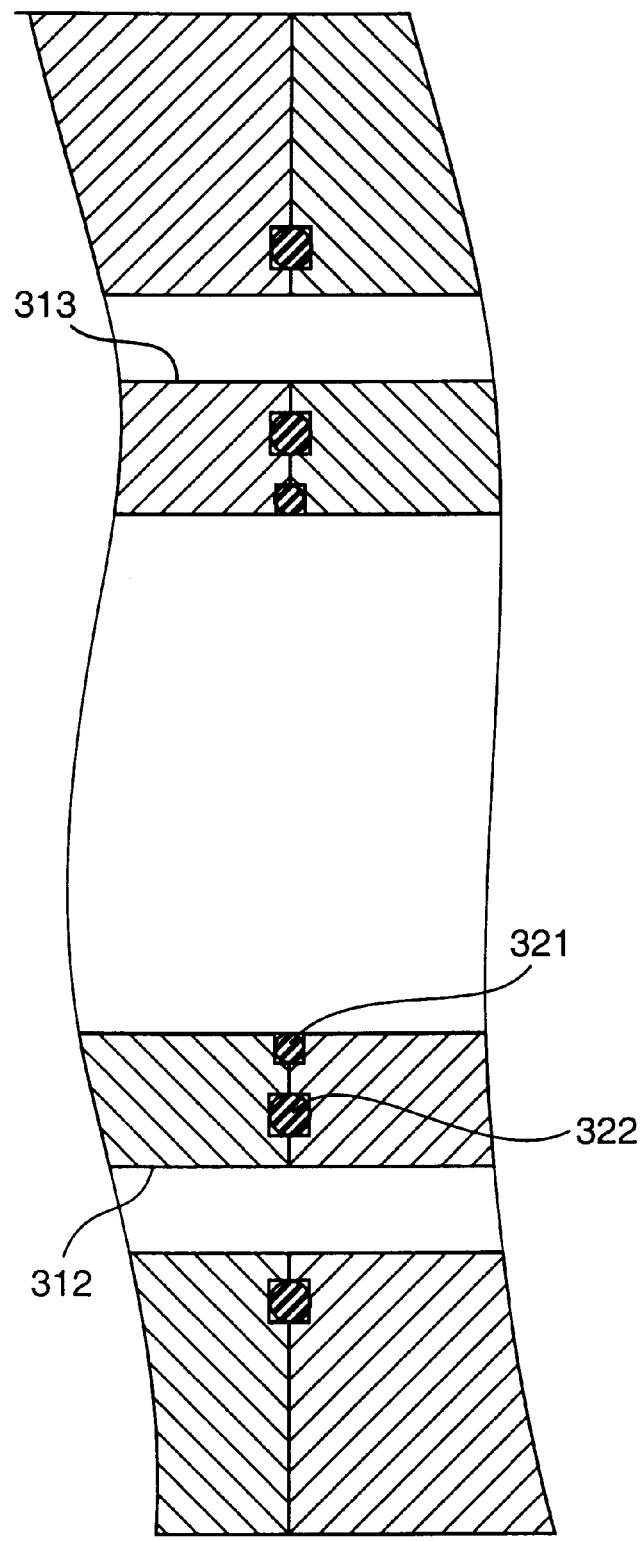
FIG. 37 is a cross-sectional view along the lines 37—37 of FIG. 36.

The O ring 321 in the groove 318 acts to seal against the outside surface of the valve member or spool. The O rings 322 and 323 form face seals surrounding the bore 302 and inwardly of the outer surface of the valve body. The O rings 322 and 323 thus prevent escape of liquid radially outwardly from the bore 302 to the outside surface of the valve. Also as best shown in FIG. 37, the O ring 322 is arranged inwardly of the channels 312 and 313 and the O ring 323 is outwardly of the channels so as to prevent water from escaping inwardly or outwardly relative to the channels.

In some examples where the channels 312 and 313 are omitted, only a single end face seal may be used. In other embodiments, the O ring 321 can act both as an axial seal and a radial seal.

Turning now to FIG. 39, further detail is shown of the construction of the groove 318 and its corresponding O ring 321. Thus the groove 318 in cross section has an outer cylindrical base surface 325 which surrounds the axis 308 and lies on a cylinder surrounding the axis. The groove further has two side walls 326 and 327 which connect with the base 325 and extend radially inwardly therefrom, each lying in a radial plane of the axis.

Each side wall includes a lip portion 328, 329 respectively which extends from the side wall toward the opposite side wall so as to reduce the width between the side walls in the area of the lip.

Each lip comprises an inclined wall 330 which commences at the respective side wall and is inclined therefrom toward an apex 331 at a junction with the bore 302.

Within the groove is inserted the O ring 321 which has a circular cross section at the groove.

The main function of the lips 328 and 329 is to retain the O ring within the groove. For this reason the space between the apexes 331 is significantly less than the diameter of the O ring cross section so as to prevent any possibility of the O ring being dislodged from its position within the groove.

Therefore, in order to insert the O ring within the groove, in this embodiment the groove is located at the junction between the end faces of the valve portions so that the O ring can be installed prior to connection of the end faces.

In FIG. 39, the arrangement is intended for high pressure use so that the O ring is placed under significant pressure within the groove. Thus the distance A between the side walls 326 and 327 is also less than the diameter D of the uncompressed O ring cross section. In one example the distance A is of the order of 0.943×D. Furthermore, the distance B between the bottom of the lip and the base 325 is very much less than the diameter D and preferably of the order of 0.663×D. The distance C between the surface 302 and the base 325 is also less than the diameter D and preferably of the order of 0.850×D. Thus the O ring is compressed inwardly by the side 326 and 327 and is compressed downwardly by the surfaces 330 of the lips so that a bulbous portion 332 of the O ring is squeezed between the lips and inwardly of the surface 302 for contacting the land surface of the spool.

The angle of the surface 330 as indicated at AA is preferably of the order of 57°. This provides a lip which projects inwardly from the sides of the groove but is not sufficiently sharp and may be rounded as shown to avoid pinching the O ring sufficiently to cause cutting or tearing of the O ring. The lip extends inwardly sufficiently to prevent any possibility of the O ring escaping from the groove. The lip acts to compress the O ring so that the O ring is more dense in the area of the bulbous portion 332 and thus applies greater pressure onto the land surface of the spool.

In FIG. 40 is shown a similar arrangement for use with a low pressure application. In this arrangement the space A between the side walls is slightly greater than the diameter of the O ring cross section. In this way the 0 ring is substantially uncompressed within the groove except that the lips extend inwardly over the top of the O ring so that only a part of the O ring between the lips is exposed above the surface 302. The lips in this arrangement therefore provide little or no compression on the O ring but prevent the O ring from escaping from the groove since the space between the lips is significantly less than the diameter of the O ring.

In the embodiments shown, the lips are formed integrally with the side walls by a machining operation. This construction is preferably used with the arrangement in which the grooves are formed at the junction between the portions. However alternative arrangements can be used which allow the grooves to be formed on the interior of a valve bore. This may require that the lips be formed as an insert portion separate from the side walls and inserted into the groove formed by the side walls.

While one embodiment of the present invention has been described in the foregoing, it is to be understood that other embodiments are possible within the scope of the invention. The invention is to be considered limited solely by the scope of the appended claims.

What is claimed is:

1. Apparatus for treating water from a water supply comprising:

a water supply inlet;

a treatment reactor having a housing, a membrane within the housing, a first port, a second port, and a third port in the housing, said treatment reactor being arranged such that a supply stream from the supply inlet fed to one of the first and second ports passes over the membrane to form a waste stream at the other of the first and second ports while consumption water passes through the membrane to the third port so that the waste stream contains an increased level of contaminants relative to the supply stream and the consumption stream;

a storage tank for receiving and storing consumption water from the third port;

a pump for pumping water through the reactor to said one of the first and second ports;

ducting connecting the water supply inlet to the pump, the pump to the treatment reactor, and the treatment reactor to the storage tank and communicating a flow of water therebetween;

and a valve for use in controlling flow of the water through the ducting;

said valve comprising;

a valve body;

a plurality of ports in the valve body for connection to the ducting, each port having a channel extending into the valve body for communication of water thereto;

a cylindrical bore arranged along an axis of the valve body such that each said channel extends through the valve body to the bore defining an opening at the bore;

a valve member having a cylindrical outer surface arranged as a sliding fit within the bore and movable longitudinally in the valve body and arranged relative thereto so as to provide a plurality of longitudinally spaced positions for controlling water flow between selected ports;

and control means for selectably moving the valve member between the plurality of longitudinally spaced positions thereby controlling water flow through the ducting.

2. The apparatus according to claim 1 wherein membrane is a thin film or reverse osmosis membrane.

3. The apparatus according to claim 1 wherein the cylindrical outer surface of the valve member includes a plurality of axially spaced annular recesses arranged to communicate water longitudinally of the valve body between respective ones of the openings.

4. The apparatus according to claim 1 wherein the valve has an interior channel therealong for communicating fluid between spaced ports thereof the channel being maintained separate from ports intermediate the spaced ports.

5. The apparatus according to claim 4 wherein the interior channel extends along the valve member.

6. The apparatus according to claim 4 wherein the interior channel extends along the valve body.

7. The apparatus according to claim 1 wherein the valve body is formed from a plurality of axially separated, coaxial portions, each separated from and clamped to the next at an end face of the portion lying in a plane radial to the axis.

8. The apparatus according to claim 7 wherein the portions are clamped together by clamping rods extending along the length of the valve body.

9. The apparatus according to claim 8 wherein each portion includes a plurality of dowel rods projecting from a face thereof for engagement into a corresponding receptacle of the next adjacent portion, each dowel rod having a central bore through which the clamping rod passes.

10. The apparatus according to claim 7 wherein each portion includes a single one of the ports.

11. The apparatus according to claim 7 wherein each portion includes a plurality of dowel rods projecting from a face thereof for engagement into a corresponding receptacle of the next adjacent portion.

12. The apparatus according to claim 7 wherein each portion has at the end face thereof a part of a groove at the cylindrical bore thereof such that when the end faces are clamped together the parts of the groove are aligned to cooperate to define an annular O-ring groove for containing an O-ring for surrounding and sealing against the outer surface of the valve member.

13. The apparatus according to claim 7 wherein the O-ring groove has axially spaced side walls between which the O-ring is received, each side wall having a lip at the cylindrical bore extending axially from the side wall such that the space between the lips at the bore is less than the space between the side walls at a position spaced from the bore so as to act to retain the O-ring in the groove.

14. The apparatus according to claim 13 wherein the space between the lips is less than the diameter of the cross-section of the O-ring.

15. The apparatus according to claim 14 wherein the space between the side walls is less than the diameter of the cross-section of the O-ring.

16. The apparatus according to claim 13 wherein each lip is defined by a wall which is inclined at an angle to the radial plane and extends to an apex at the bore.

* * * * *